Sept. 26, 1933.  H. L. PITMAN  1,927,951
COMBINED TYPEWRITING AND COMPUTING MACHINE
Filed Dec. 7, 1928  8 Sheets-Sheet 1

INVENTOR:
Henry L. Pitman
BY D. C. Stickney
ATTORNEY.

Sept. 26, 1933.   H. L. PITMAN   1,927,951
COMBINED TYPEWRITING AND COMPUTING MACHINE
Filed Dec. 7, 1928   8 Sheets-Sheet 3
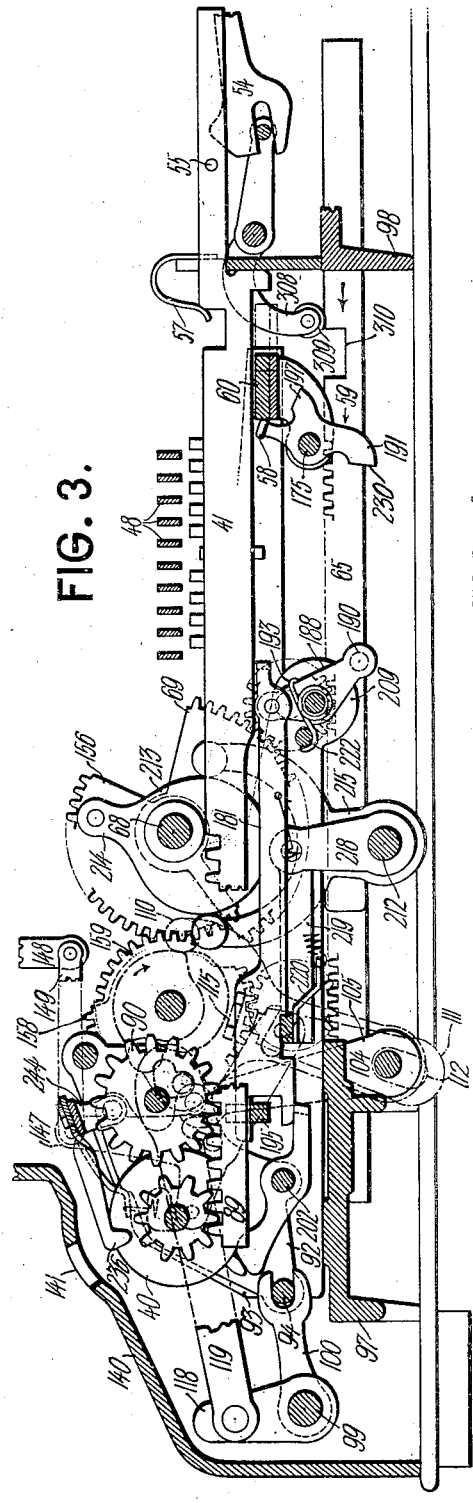
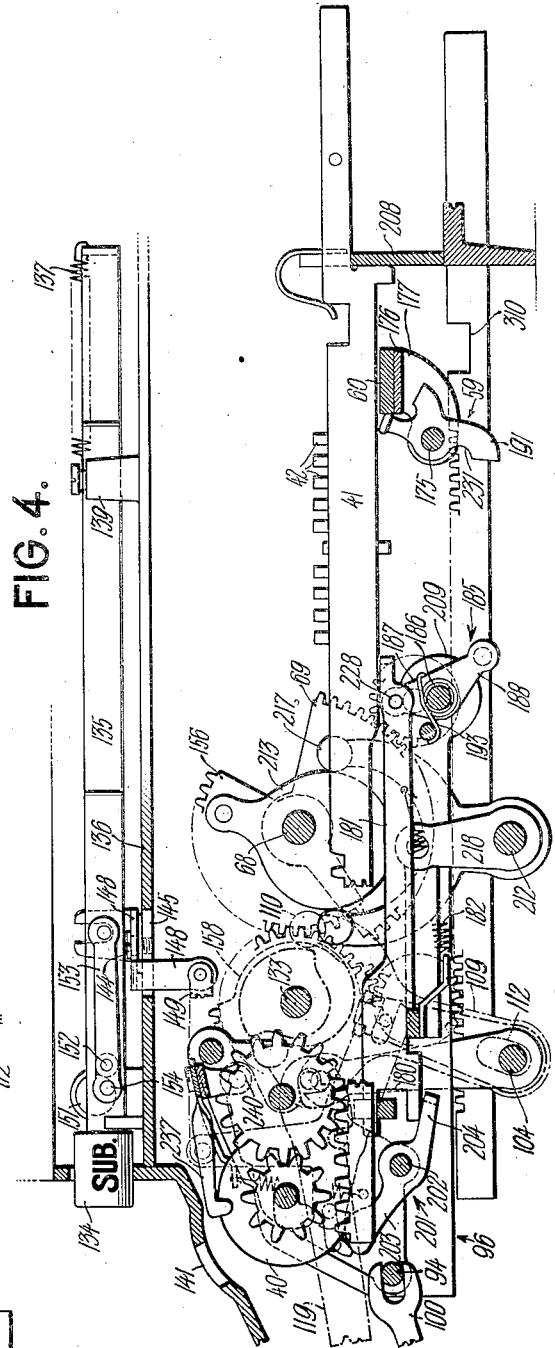
INVENTOR:
Henry L. Pitman
BY B. C. Stickney
ATTORNEY.

Sept. 26, 1933.    H. L. PITMAN    1,927,951
COMBINED TYPEWRITING AND COMPUTING MACHINE
Filed Dec. 7, 1928    8 Sheets-Sheet 4
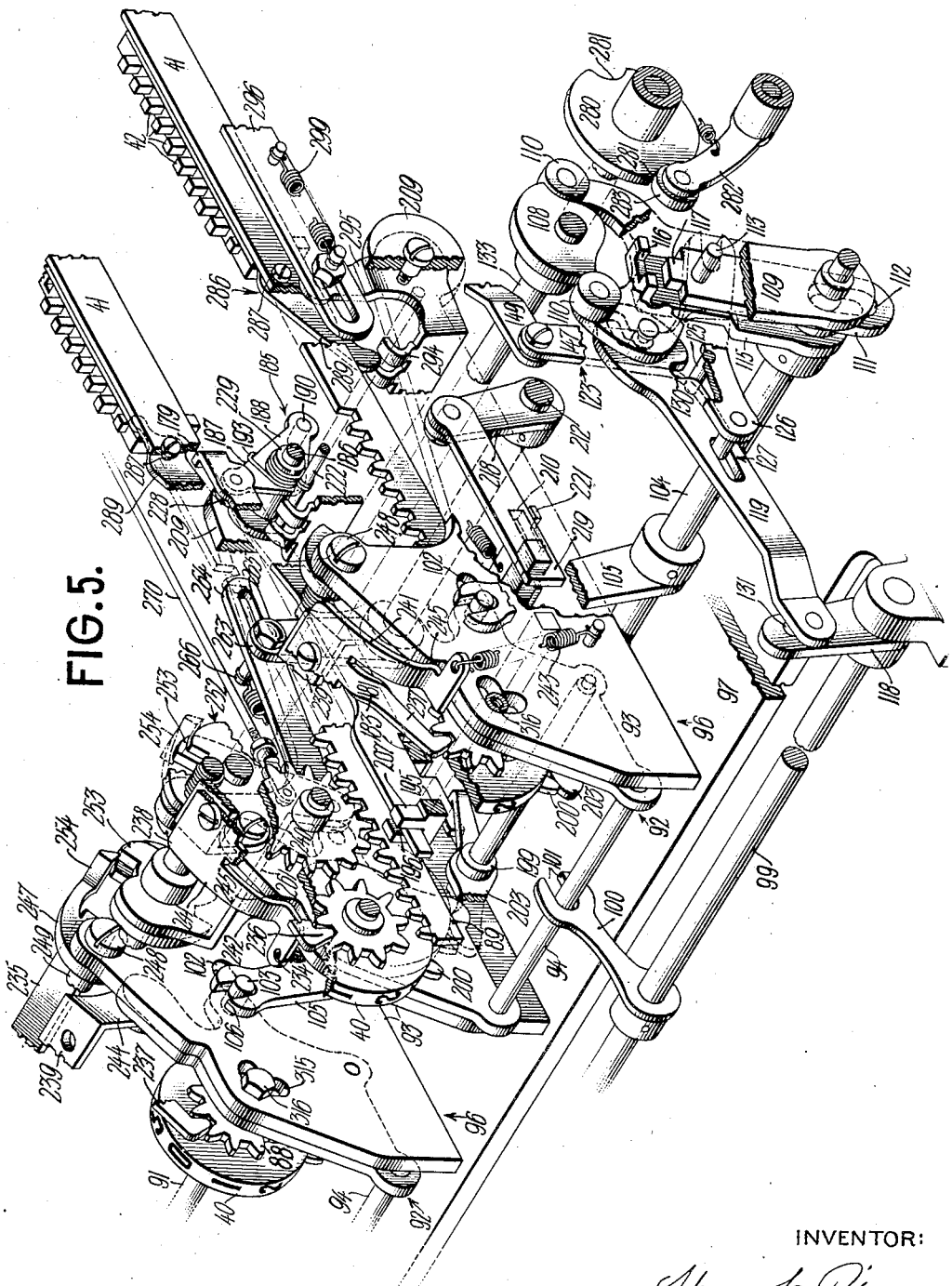
INVENTOR:
Henry L. Pitman
BY
ATTORNEY.

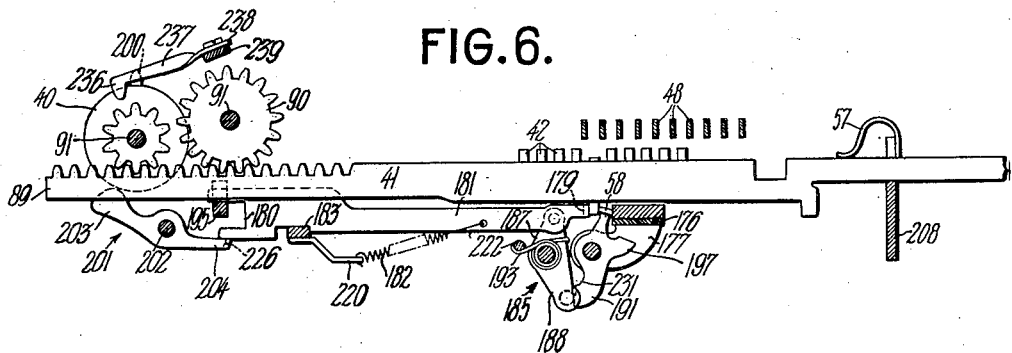

Sept. 26, 1933.   H. L. PITMAN   1,927,951
COMBINED TYPEWRITING AND COMPUTING MACHINE
Filed Dec. 7, 1928   8 Sheets-Sheet 6

INVENTOR:
Henry L. Pitman
BY
ATTORNEY.

Sept. 26, 1933.   H. L. PITMAN   1,927,951
COMBINED TYPEWRITING AND COMPUTING MACHINE
Filed Dec. 7, 1928   8 Sheets-Sheet 7
FIG. 16.
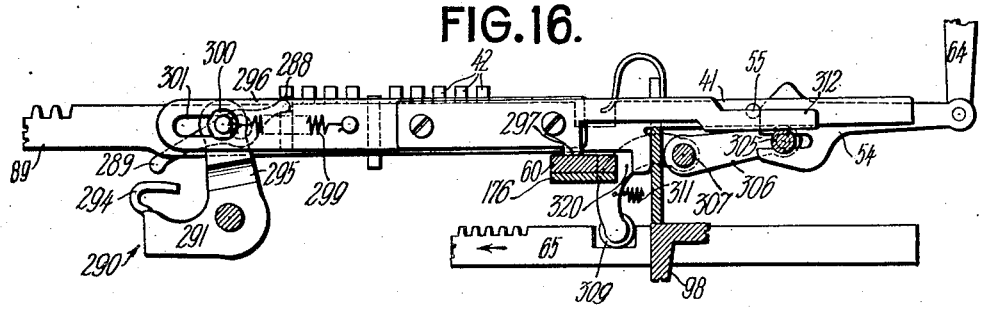
FIG. 17.
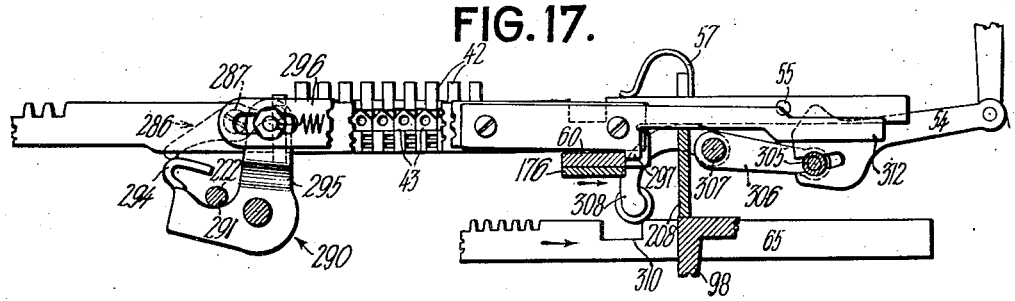
FIG. 18.
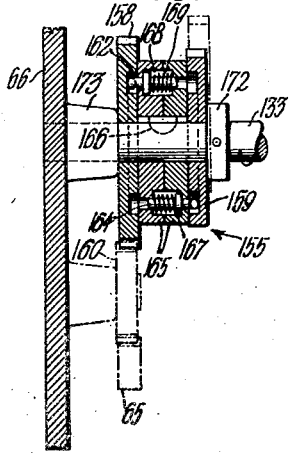
FIG. 19.
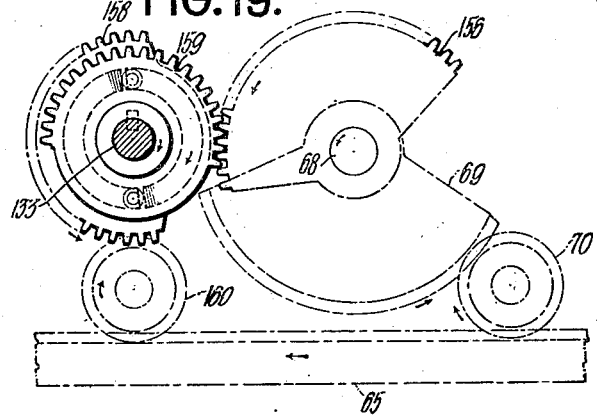
FIG. 20.
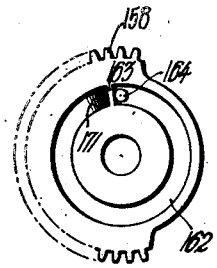
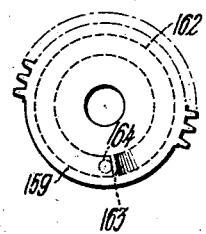
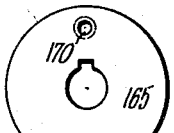
INVENTOR:
Henry L. Pitman
BY B. L. Stickney
ATTORNEY.

Sept. 26, 1933. H. L. PITMAN 1,927,951
COMBINED TYPEWRITING AND COMPUTING MACHINE
Filed Dec. 7, 1928 8 Sheets-Sheet 8
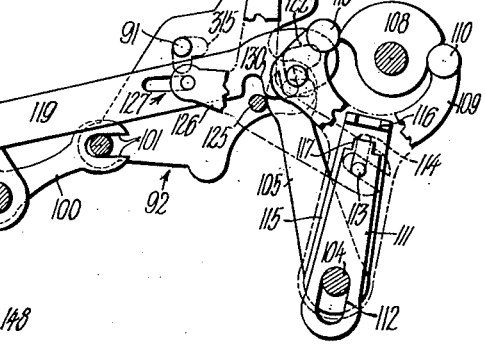
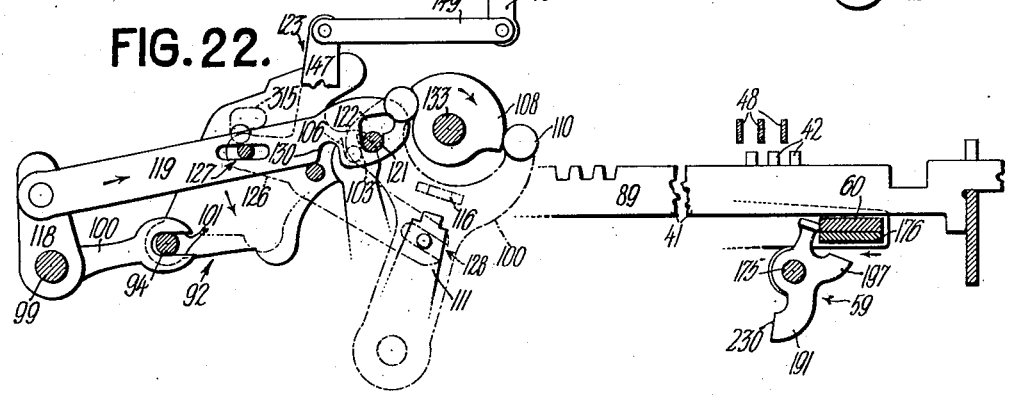
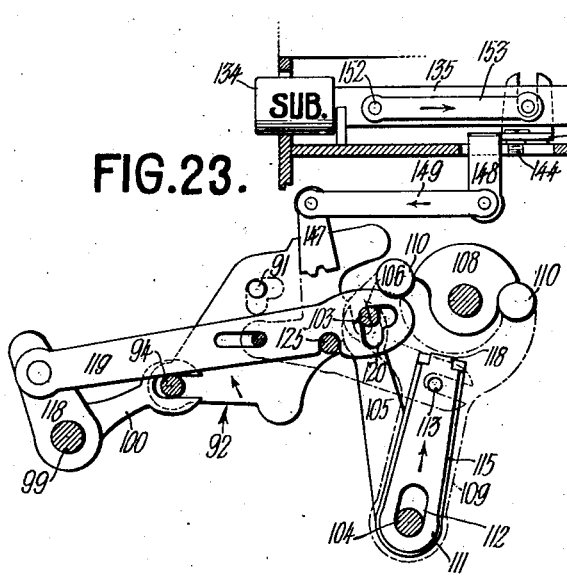
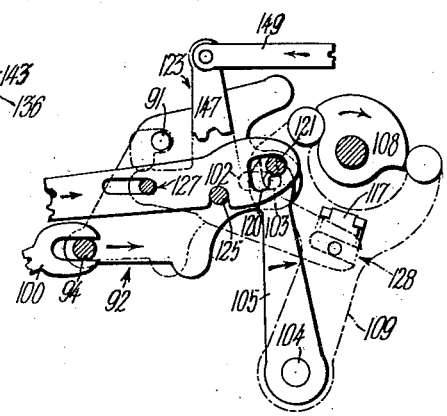
INVENTOR:
Henry L. Pitman
BY
ATTORNEY.

Patented Sept. 26, 1933

1,927,951

UNITED STATES PATENT OFFICE

1,927,951

COMBINED TYPEWRITING AND COMPUTING MACHINE

Henry L. Pitman, Westfield, N. J., assignor to Elliott-Fisher Company, New York, N. Y., a corporation of Delaware Application December 7, 1928. Serial No. 324,353

37 Claims. (Cl. 235—60)

This invention relates to computing mechanism in which computing wheels rotate in one direction for addition and in the opposite direction for subtraction, and also relates to a novel tens-carrying mechanism and novel means for preventing overthrow of the computing wheels. The invention is particularly applicable for modifying the well-known Underwood-Hanson computing machine for direct subtraction, thus greatly simplifying said machine, and for simplifying the tens-carrying mechanism and overthrow-preventing mechanism of said machine.

The Underwood-Hanson machine is described in the patent to O. Minton No. 1,280,065 dated September 24, 1918, which also discloses the Underwood subtraction mechanism, whereby subtraction is effected by adding the usual complement of the subtrahend. Said machine includes a series of computing wheels, having one-way connections to reciprocatory-operating racks formed at the end of register-bars. Each register-bar has index-pins for the digits 1 to 9, individually settable into the path of a reciprocatory general-operator cross-bar for advancement of the register-bar by said cross-bar to accumulate the digit indexed.

The digits are indexed in the register-bars seriatim by operation of numeral-type keys, the seriatim selection being effected by slightly advancing the register-bars seriatim under pin-setting devices by means of the step-by-step letter-feeding movements of the typing carriage, said type-keys and carriage being part of the typewriter, which forms part of the Underwood-Hanson machine. For each numeral-type key there is an edgewise movable pin-setting bar arranged parallel to and over the corresponding row of the transverse rows of index-pins presented by the series of register-bars in their normal positions.

Each transverse row of pins is slightly behind its pin-setting bar so that for a pin in any register-bar to be set, said register-bar must be slightly advanced so that its pins come under corresponding pin-setting bars. Normally the pin-setting bars would descend idly into the spaces between the transverse pin-rows. Extending transversely of pin-setting linkages, which include the pin-setting bars, are linkage-actuating rock-shafts, each rock-shaft underlying a corresponding numeral-key and being operable by said key, each shaft having an arm for engaging the corresponding pin-setting linkage. In the Underwood subtracting mechanism each rock-shaft is provided with an additional arm to engage the linkage for the complementary index-pin. Thus the rock-shaft for the "1" numeral-key is capable of actuating either the linkage for the "1" index-pin row or the linkage for the "9" index-pin row, 9 being the complement of 1. Each of the other numeral-keys is capable of similarly operating either the pin-setting linkage corresponding to its number or the pin-setting linkage corresponding to the complement of said number. To this end, all the rock-shafts are shiftable endwise between two positions so that in one position one set of arms will engage the pin-setting linkages corresponding to the direct numbers, as for addition, while in the other position the other set of arms on said rock-shafts will engage pin-setting linkages corresponding to the complement of said numbers, as for subtraction.

A subtraction-setting mechanism called into action by operation of a subtraction-key is provided to bring about the shifting of said rock-shafts simultaneously preparatory to a subtractive operation of the computing mechanism. Concomitantly with the shifting of the rock-shafts for subtraction, all 9 pins in the several register-bars are pre-set. Means are also provided for restoring the 9 pins in those register-bars in which a number other than 0 or 9 is subsequently indexed by operation of the numeral-type keys, it being understood that a register-bar in which no number is set must retain the setting of its 9 pin to bring about the indication of the correct result in the computing wheels, 9 being the complement of 0. Means whereby the units register-bar advances an additional unit to thereby afford the usual complement of 10 instead of the complement of 9 in the units column are also provided.

Tens-carrying mechanism of the Underwood-Hanson machine is described in Patent No. 1,278,812 to H. Hanson, dated September 10, 1918.

According to the present invention, the subtraction-mechanism is much simplified in comparison with the Underwood subtraction mechanism just briefly described. State-determining means are provided whereby the dial-wheels are caused to rotate in one direction for addition or to rotate reversely for subtraction. The subtraction is therefore "direct", as distinguished from subtraction effected by adding the complement of the subtrahend, and hence there need be no means for shifting the aforesaid rock-shafts, for pre-setting the 9 pins, for restoring a 9 pin when another pin is indexed, or for affording the complement of 10 in the units column.

In the present invention, the register-bars having the computing wheel driving racks and the index-pins are retained. For addition the computing wheels are driven directly by said driving racks, whereas for subtraction the computing wheels are driven by intermediate rotation-reversing pinions or racks which may be permanently in mesh with the driving racks. The computing wheels are normally disengaged from both the driving racks and the intermediate pinions, and by the state-determining means are brought into mesh, either with the driving racks on the register-bars or with the intermediate pinions, during an initial portion of the advance movement of the general operator, depending on the setting of the state-determining means. Said state-determining means may be normally set or conditioned for addition so that normally the computing wheels will be directly driven by the driving racks on the register-bars. For subtraction said state-determining means may be conditioned as by the operation of a subtraction-key to bring the computing wheels into engagement with the intermediate pinions.

The computing wheels remain in mesh throughout the rest of the advance movement of the general-operator cross-bar. Driving means for said general operator may be so arranged that at the end of said advance movement said general operator stands stationary for an interval of time to insure completion of the tens-carrying operation, as will hereinafter be made clear, the return movement of the general operator being commenced at the end of said interval. In the initial portion of said return movement, the computing wheels are caused to be disengaged before the general-operator cross-bar picks up the advanced register-bars to restore them to their normal positions. By thus disengaging the computing wheels, before the return of the register-bars, the necessity for providing one-way connections of the computing wheels to the register-bars is avoided, with consequent simplification of the mechanism.

For shifting the computing wheels into and out of mesh with the register-bar racks or the intermediate racks, they may be mounted in a shiftable frame forming part of the aforesaid state-determining means. Trunnions may project from the outer sides of said frame through guiding slots of fixed members adjacent to said outer sides, said slots being parallel to the register-bar racks. A swingable arm extending substantially parallel to said register-bar racks may also have a slot, parallel to said register-bar racks, which may embrace a stud or cross-member of said frame, said stud or cross-member being spaced from said trunnions in the direction in which said register-bar racks extend. Said frame may be thus guided by said slots for movement to bring the computing wheels toward or away from the intermediate pinions which are in mesh with said racks. By swinging the slotted end of said arm toward or from said racks, the frame is tilted about the axis of said trunnions to bring the computing wheels toward or from the register-bar racks. The shifting of the frame toward or from the intermediate pinions may be accomplished by swingable arms connected to said trunnions, and the setting or conditioning of the state-determining means resides in the connection of either the latter arms or of the aforesaid arm that extends parallel to the register-bar racks, with arm-actuating means driven by the general operator.

The carrying of tens from one computing wheel to another computing wheel of the next higher denomination involves the release of a spring-pressed normally latched register-bar stop through the movement of said first computing wheel past its carrying position. The register-bar stop in its normal unreleased position is effective to limit the movement of the register-bar for the computing wheel of next higher denomination, to the end that said register-bar may not be overthrown while being driven forward by the general-operator cross-bar. When said register-bar stop is released from its latch, and is, in consequence, caused to be withdrawn by its spring, the register-bar is permitted to advance an extra unit space to thereby carry over a tens value, said stop being still effective, however, to prevent overthrow of the register-bar, since it is only withdrawn enough to permit said extra advance.

If a register-bar stop be released and withdrawn before the general operator reaches the end of its advance movement, the register-bar which said stop controls is, according to an important feature of the invention, advanced positively for "carrying", by the movement of the general-operator cross-bar as it completes its advance stroke. To this end, the general-operator cross-bar does not engage the index-pins directly for advancing the register-bars, but there are interposed ahead of said cross-bar for engaging the index-pins, the ends of a series of levers of the first order pivoted on a fulcrum-rod carried by the general-operator cross-bar. The other and normally free ends of said levers are, in the direction of cross-bar movement, opposite the free ends of a series of similar levers of the first order pivoted on a fixed fulcrum-rod, the other ends of said latter levers being connected to the aforesaid register-bar stops. The levers connected to said stops are capable of two positions, depending on whether or not the stop is withdrawn for carrying. If a stop is not withdrawn for carrying, the free end of the lever connected thereto just meets the free end of the opposite lever on the fully-advanced general-operator cross-bar. The two levers thus meeting form a pincer-like arrangement wherein the index-pin is held between the register-bar stop and the opposite end of the lever on said cross-bar, said cross-bar backing up said opposite lever end. Thus the advanced position of the register-bar is secured against overthrow and also against rebound. Should a register-bar stop be withdrawn before the general-operator cross-bar reaches the end of its advance movement, the free end of the lever connected to said register-bar stop will be moved toward the free end of the opposite lever on the approaching cross-bar and thus constitutes an interponent which will engage and arrest said free end of the cross-bar lever just before the cross-bar completes its advance movement.

It will be understood now that as said cross-bar advance movement is completed, the lever on the cross-bar will be rocked because of the arrest of its free end, thereby causing an extra tens-carrying advance of the register-bar, the extra advance being positive due to the positively driven cross-bar. The levers may be so proportioned that when a sufficient extent of carrying advance is reached, the index-pin is again held between the register-bar stop and the opposite end of the lever on the cross-bar to prevent overthrow or rebound of the register-bar. The free ends of the two series of levers may be proportioned and arranged so that the levers connected to the register-bar stops may lock the levers on the cross-bar against reverse movement at the end of a carrying movement of said cross-bar levers. Such proportioning and arrangement of said free ends are also effective to stabilize the levers connected to the register-bar stops as their free interponent ends co-operate to rock the cross-bar levers, inasmuch as the lines of reaction, which the free ends of said stop-levers afford to rock the cross-bar levers and lock the same against reverse rotation, may in either case pass through the fulcrum center of said stop-levers.

If, as may happen in some computations, a register-bar stop be released and withdrawn for carrying a tens value after the general-operator cross-bar has completed its advance movement, the carrying advance of the register-bar controlled by said stop may be effected by power derived from suitable springs connected either to the register-bar stop or its lever. In this case it will be understood that the free ends of the stop-lever and the opposite cross-bar lever just meet as the cross-bar completes its advance and that a subsequent release and withdrawal of the stop will cause the lever connected therewith to be rocked by the power of the aforesaid spring, with a consequent rocking of the lever on the cross-bar and a consequent carrying advance of the register-bar whose set index-pin is held between the register-bar stop and cross-bar lever as aforesaid.

It will be seen now that the cross-bar levers, broadly considered, constitute rack-engaging fingers, which, in respect to said cross-bar or any other suitable movable member on which they may be mounted, may be advanced one unit-space, thus enabling said cross-bar or movable member which has a fixed extent of movement to advance the racks an extra unit-space for carrying. It will also be seen that the advance of said fingers in respect to the cross-bar, and hence the "carrying" of the register-bars, are in most cases accomplished positively.

In practicing the invention the register-bar stops may be in the form of elongate bars connected at one of their ends to their respective levers, said ends also forming the stop or abutment between which and the cross-bar lever or finger, the index-pin is held at the end of the register-bar movement. Said stop-bars, viewed sidewise of the register-bars, may extend substantially parallel to the latter and may be latched at their other ends over a latching bar. Each computing wheel may have the usual carrying tooth. Said tooth, in the preferred form of the invention, does not, for "carrying" as aforesaid, release the corresponding register-bar stop by direct engagement, but instead, for convenience of arrangement of the parts, releases said stop through an intermediate carrying lever, one end of which may be engaged by said carrying tooth, and the other end of which may engage the stop to displace the same from the latching bar. The tooth-actuated carrying levers may be mounted in the aforesaid frame, in which the computing wheels are mounted, and may be so arranged that the ends which engage the stops may properly engage said ends irrespective of the shifting of said frame either toward the register-bar racks or towards the intemediate racks.

A series of detents may engage the teeth of the computing-wheel pinions to hold the same against displacement when they are disengaged from both the register-bar racks and the intermediate racks. Said series of detents may be so arranged that when the computing wheels are moved toward the register-bar racks the computing-wheel pinions recede from said detents. The movement of the frame carrying the computing wheels toward the intermediate racks may be utilized, as will be shown, to withdraw the series of detents from the computing-wheel pinions.

The register-bar stops as a whole, together with their latching bar, may be retracted or shifted to effect relatching of the released stops, which, to this end, may at the end of their retracted movement stop against a suitable abutment, the latching bar moving sufficiently further to effect the relatching. The retraction of the stops is also desirable so that said stops may not be in the way of the normally set zero index-pins during the seriatim advance of the register-bars for pin-setting as aforesaid. Suitable operating devices for thus retracting and relatching the register-bar stops and advancing them as a whole toward their effective positions at the proper times may be connected to the general operator as a source of power and thus timed with the movement of said general operator which in turn is connected to a source of power, as, for example, an electric motor.

To afford time for moving the computing wheels into engagement with the register-bar racks or intermediate racks, the general-operator cross-bar and its register-bar moving fingers may have at the beginning of their advance stroke an idle movement before they may engage the highest index-pins. To afford time for withdrawing the computing wheels from the register-bar racks or the intermediate racks, the general-operator cross-bar has also an idle period at the beginning of its return movement before it begins to restore any register-bar.

To insure that the register-bar racks and the intermediate pinions shall be in proper position for engagement with the computing-wheel pinions, an aligning device may be arranged to drop into the teeth, say of the intermediate pinions, just before the computing wheels are moved into engagement. Said device may also be withdrawn before the register-bars and intermediate pinions, with the computing wheels safely under the control of either, begin to move. Said aligning device may be again dropped into effective position just before the computing wheels are moved out of engagement, to the end that the teeth of the computing-wheel pinions are properly aligned with the aforesaid computing-wheel detents, and again said device may be withdrawn as the computing wheels are restored to the control of said detents, before return movement of the register-bars and intermediate pinions begins.

Other features and advantages may hereinafter appear.

In the accompanying drawings,

Figure 3 is a cross-sectional side view of the computing mechanism on an enlarged scale as compared with Figure 1 and indicates the operation of the parts just after the general operator has started forward, the computing wheels being indicated as engaged directly with the register-bar racks for addition.

Figure 4 is a view similar to Figure 3, but shows the computing wheels engaged with the intermediate racks or pinions for subtraction, Figure 4 also indicating a subtraction-key and its connection with the state-determining means.

In Figures 3 and 4 the relation of certain parts of the state-determining means, for addition in Figure 3, and for subtraction in Figure 4, is indicated by dot-and-dash lines.

Figure 5 is a view bringing out in perspective many details of the computing-wheel actuating mechanism and of the state-determining means.

Figure 6 indicates a fully-advanced register-bar and how it is held between the register-bar stop and register-bar engaging finger under the condition in which said stop has not been released for carrying, the computing wheel being shown as directly driven by the register-bar for addition.

Figure 7 is similar to Figure 6, showing, however, the stop released for carrying, and the consequent position of the register-bar engaging finger, which is shown advanced in respect to the cross-bar to thereby "carry" the register-bar.

Figures 8 and 9 are similar to Figures 6 and 7, respectively, but show the computing wheels driven through the intermediate racks or pinions. Figures 8 and 9, compared with Figures 6 and 7, indicate that the operation of the register-bar stop and register-bar engaging finger is the same for addition as for subtraction; Figure 8 indicating a "non-carrying" condition as in Figure 6; and Figure 9 indicating a "carrying" condition as in Figure 7.

Figure 10:
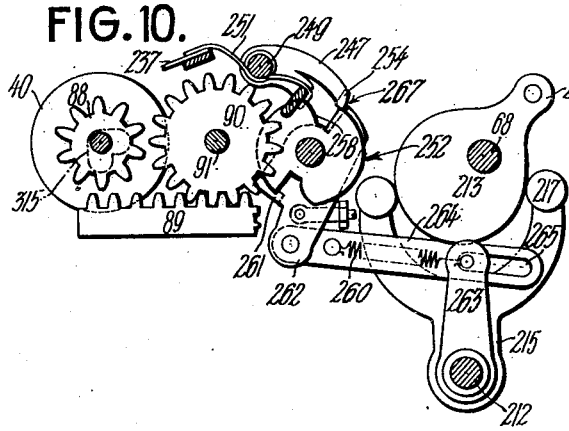
Figure 11:
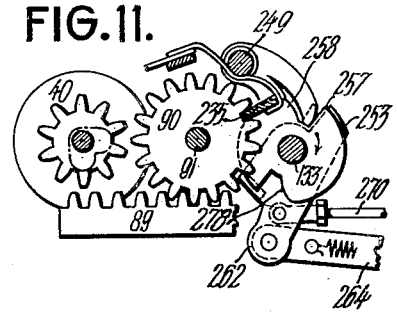
Figure 12:
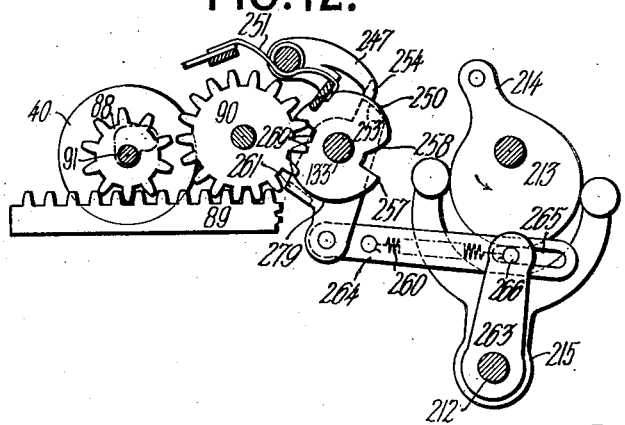
Figure 13:
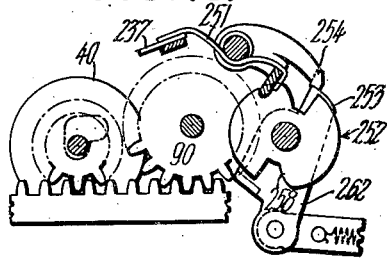
Figures 14, 15:
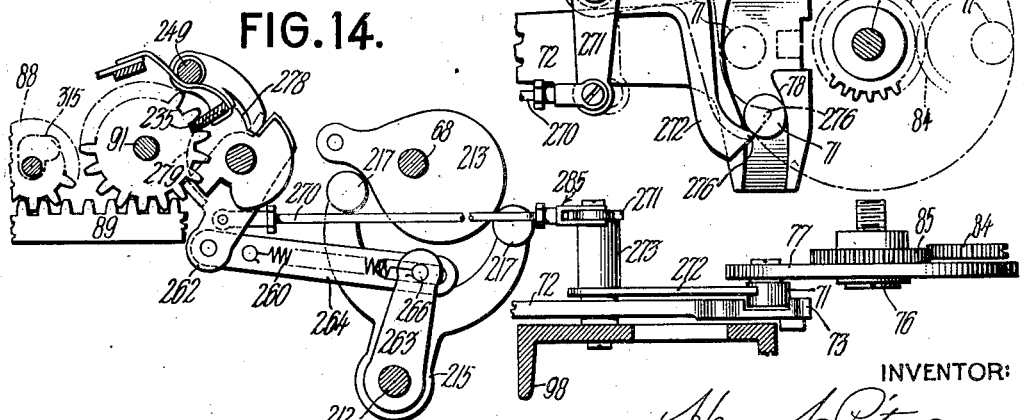

Figures 10 to 14 indicate different stages of the operation of an aligning bar for aligning the teeth of the intermediate pinions and consequently of the register-bar racks, and its releasing and withdrawing means: Figure 10 indicates the normal condition of said bar and releasing and withdrawing means: Figure 11 indicates how said bar is released and dropped into the intermediate pinions as soon as the general operator begins to move: Figure 12 indicates how the bar is withdrawn before the register-bars and intermediate pinions begin to move: Figure 13 indicates the aligning bar and a controlling latch therefor just at the time when said bar is to be dropped in again before moving the computing wheels out of engagement: Figure 14 is a side elevation view indicating how the latch, shown in Figure 13 as holding the aligning bar, is withdrawn. Figure 14 also shows the connection to, and control of said latch by operating means for the general-operator cross-bar.

Figure 15 is a top plan view of part of Figure 14 and shows details of the operating means for the general-operator cross-bar, whereby the general operator is caused to be stationary for a certain interval after the completion of its forward stroke, to permit carrying.

Figures 16 and 17 indicate fragmentary views of the register-bars, and the index-pins therein, and shows means whereby the index-pins are caused to be restored as the general operator returns said bars to their normal positions: Figure 16 shows a register-bar and said restoring means in normal positions, one of the index-pins being indicated as set preparatory to a forward movement of the register-bar: Figure 17 indicates operation of the pin-restoring means by the return movement of the general-operator cross-bar.

Figures 18, 19 and 20 are views, showing details of means whereby reciprocatory movement of the general operator is translated into a complete revolution of a shaft having various cams for actuating the state-determining means and the rack-aligning bar.

Figures 21 to 24 are views illustrating the state-determining means and the operation thereof. Figure 21 shows the additive condition of the state-determining means normally prevailing when the computing mechanism is not accumulating a number. Figure 22 illustrates the operation of the state-determining means conditioned as in Figure 21, to shift the computing-wheel frame for addition. Figure 23 illustrates how the state-determining means are conditioned for subtraction by the operation of a subtraction-key prior to a subtractive accumulating operation of the computing mechanism. Figure 24 illustrates how the state-determining means conditioned, as shown in Figure 3, are operated to shift the computing-wheel frame during subtraction.

Figure 1:
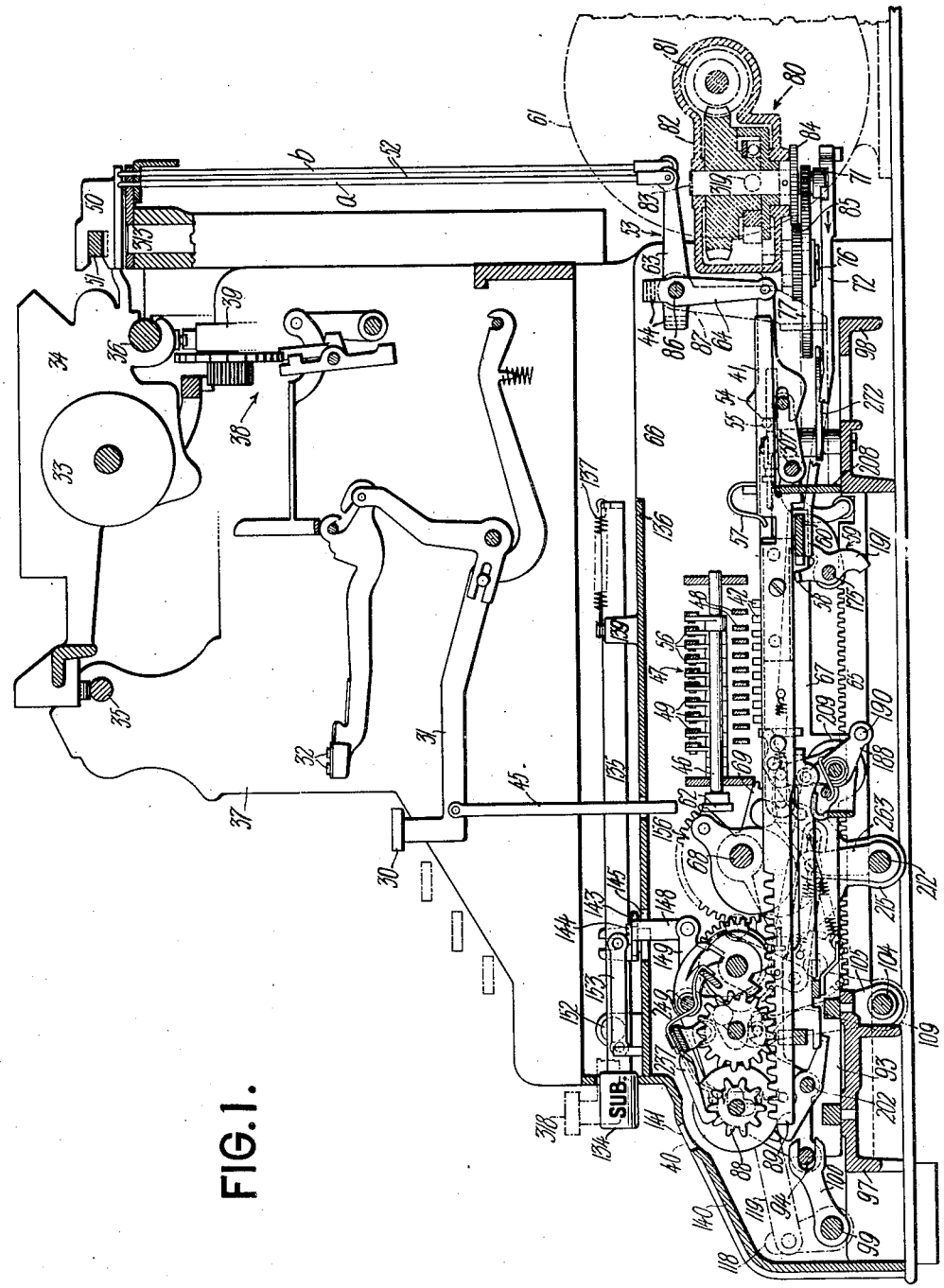
Figure 1 is a cross-sectional side elevation, showing details of the novel computing mechanism, and showing the typewriter with which said mechanism is combined.

As seen in Figure 1, the novel computing mechanism co-operates with a typewriter in which numeral-keys 30 mounted on key-levers 31 may, through other members of the usual type-action, cause types 32 to print against a platen 33. Said platen 33 is in a carriage 34 traveling on rails 35 and 36 of the typewriter-framework 37. By operation of the type-keys said carriage is propelled in letter-feeding steps determined by an escapement-mechanism 38 under control of said keys and spring-motor 39.

Figure 2:
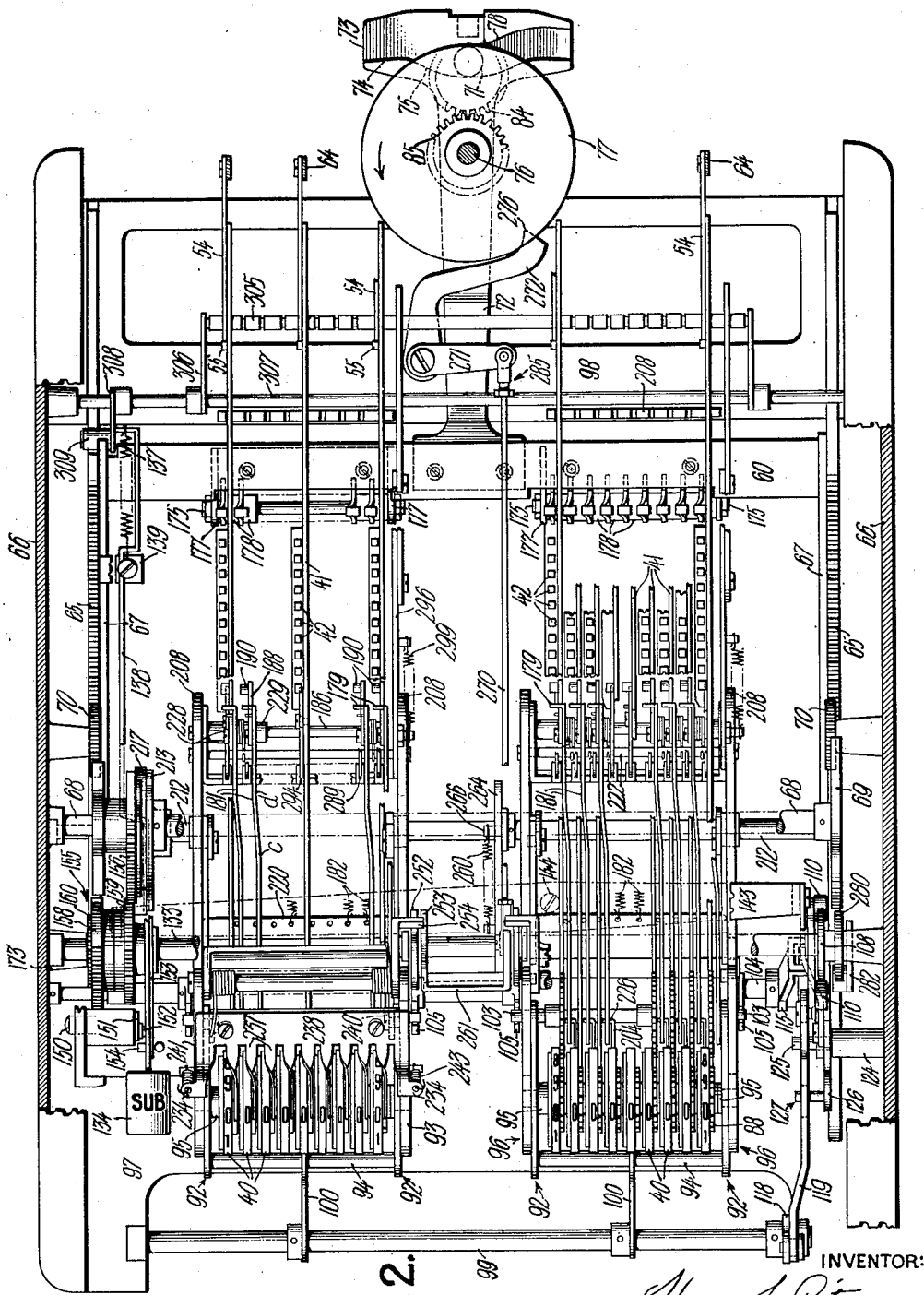
Figure 2 is a top plan view of the computing mechanism with the typewriter removed and indicates two sets of registers.

The computing mechanism may include one or more sets of computing wheels 40, Figure 2, indicating two sets of computing wheels. For each computing wheel there is a register-bar 41 carrying a series of downwardly-settable index-pins 42, for the digits from "0" to "9". As disclosed in my co-pending application, Serial No. 82,226, filed January 19, 1926, (now Patent No. 1,869,582, dated August 2, 1932) only one pin at a time may be set in a bar, the setting of one pin in a register-bar being effective to force any previously-set pin in said bar back to its normal position by means represented by cam-blocks 43, Figure 17, interposed between the stop-pins and fully described in said co-pending application, the cam-blocks, briefly explained, being displaced longitudinally of the register-bar upon depression of any pin, and by reason of their cam-formations being capable of restoring a previously-set pin as they are displaced. The "0" pin in each register-bar is normally set, and is, of course, restored by the setting of any higher pin in a register-bar.

For setting an index-pin in any register-bar, each numeral-key lever 31 has depending therefrom a stem 45, to rock a shaft 46, each key-lever having its own shaft. The several shafts 46 are for actuating parallel motion pin-setting linkages 47, one for each numeral-key. Each linkage includes a pin-setting bar 48 movable edgewise and downwardly upon operation of said linkage by its numeral-key.

The pin-setting linkages are of the type shown in the aforementioned patents to Minton and Hanson. Each pin-setting bar 48 is connected at each end to a horizontal arm of a bell-crank, not shown, vertical arms of said bell-cranks being connected to the ends of an upper bar 49. Arms 56 connect the rock-shafts 46 to the upper bars 49 of their respective linkages, each shaft also having fast to its end a horizontally-extended arm 62 engageable by the numeral-key stem 45.

Index-pins are set in the register-bars as the carriage moves predetermined zones of a work-sheet past the printing point. As indicated in Figure 1, downward movement of a pin-setting bar 48 is ineffective to set a pin in a register-bar unless the bar is slightly advanced to bring the pins therein under the pin-setting bars 48. This advance is accomplished seriatim for the several register-bars by the movement of the typewriter-carriage 34 in presenting the aforesaid work-sheet zones to the printing point. To this end, said carriage may carry a tappet 50 settable along a rail 51 of said carriage according to the location of a zone for which index-pins are to be set. By the step-by-step movement of the typewriter-carriage 34, said tappet over-rides, in seriatim order, the ends of, and thereby depresses push-rods 52, to rock bell-cranks 53, each bell-crank having one arm 63 connected to a push-rod as shown, and another arm 64 connected to one end of a shiftable interponent 54, the other end of which interponent may push upon a pin 55 projecting from the side of a corresponding register-bar. The interponents 54 afford means for disconnecting the register-bars from the bell-cranks 53, as will be explained later. The bell-cranks 53 may be fulcrumed on a shaft 86 supported between brackets 87 which may be secured as indicated by dot-and-dash lines in Figure 1. Push-rods for different registers may be arranged in different rows a and b, Figure 1, for selective engagement of their upper ends by the tappet 50 which may be cut away to clear one or the other of the rows a and b.

With the typewriter-carriage 34 in a computing zone, a push-rod 52, corresponding to the column of the work-sheet zone which is at the printing point, will be depressed by the tappet 50, and the register-bar connected thereto will be advanced, so that its index-pins 42 are under the pin-setting bars 48. Operation of a numeral-key will cause the corresponding pin-setting bar 48 to descend and set a corresponding index-pin 42. The carriage 34 then escapes, releasing the push-rod 52 and causing the register-bar to be retracted by means of a spring-device 57. In the meanwhile, the push-rod 52 for the next column will have been depressed as the carriage took its letter-feeding step and the next register-bar will have been advanced to bring its index-pins under the pin-setting bars. In this manner is the pin-setting accomplished seriatim for the register-bars as the carriage moves a computing zone of the work-sheet, column by column, past the printing point.

Transverse transposing bars 44 of the several bell-cranks 53 transpose the seriatim order in letter-feeding direction, of push-rod operation into the proper but reverse order of the seriatim indexing of the register-bars, said transposing bars 44 joining the related bell-crank arms 63 and 64 which are so located as to effect the transposition.

The index-pins 42 are set into the path of register-bar-engaging fingers 58 formed at the upper ends of levers 59, carried by a cross-bar 60 movable forward and back for advancing the register-bars and returning the advanced bars. The purpose of said levers, which is to provide for extra carrying advance of the register-bars, and the co-operating parts, will be explained further on.

The cross-bar 60 is connected at its ends to racks 65 guided for reciprocatory endwise movement along the inner sides of side members 66 of the computing-mechanism framework, said racks carrying plates 67 to which the ends of the cross-bar are attached. By moving both racks 65 in unison the cross-bar is moved evenly, and to this end the racks are coupled by a cross-shaft 68 journaled in the side members 66 and having sectors 69 fast thereto and aligned with said racks. Said sectors are connected to the racks by intermediate pinions 70 (see Figures 3, 4 and 19), to give the racks 65 the right direction of movement in respect to reciprocatory rotation of the cross-shaft 68, which may have connected thereto a handle (not shown), for hand-operation of the computing mechanism.

For operation by power the revolution of a roller 71, driven in a circle by a motor 61, is translated into reciprocatory movement of the cross-bar 60 by means of a link 72 (Figures 1, 2, 14 and 15), fastened to said cross-bar and projecting rearwardly therefrom. The link 72 has at its rear end a head 73 forming a face 74 which the roller 71, revolving in the direction of the arrow, Figure 1, may engage to push the link 722 forwardly, said roller 71 in its initial position being as indicated in said Figure 1. When the revolution of the roller 71 has advanced the link 72 sufficiently, said roller idly passes a curved portion 75 of the face 74, said curved portion 75 being at this time concentric with a stud 76 about which said roller 71 revolves on a plate 77. The period of this idle movement of the roller 71 before it begins to retract the link 72 and cross-bar 60 is utilized to insure the completion of "carrying operations", as will be explained.

As seen in Figure 2, the curved portion 75 is preferably so designed that the idle movement of the roller 71 may be about evenly apportioned on either side of the extreme forward position which said roller reaches, the length of said curved portion 75 depending on the time interval to be allowed for "carrying" before retraction of the link 72 is commenced. Figure 15 indicates the position of the roller 71 at that point of its revolution about the stud 76 where it commences the return of the link 72. For returning the link 72 the roller 71 reacts against a face 78 of the link 72. Inasmuch as the roller 71 in that part of its revolution in which it moves forward can have no effect on said face 78, said face 78 does not extend beyond the point from which said roller begins its forward movement. Moreover, by thus limiting the extent of the face 78, it is feasible to move the cross-bar 60 forwardly independently of the roller 71, as in hand-operation, in which case the normal position of the roller may be as indicated by the dot-and-dash line, Figure 15. As indicated, the face 78 may for a portion of its length be concentric with the curved portion 75 of the face 74, thereby giving acceleration to the final part of the return movement of the link 72 and keeping the roller 71 in contact with the face 74—75.

The roller 71 revolves only when the register-bars 41 are to be advanced for the accumulation of a number, and is, to this end, connectible to the motor 61 by a clutch 80, such as is shown in the patent to F. A. Hart, No. 1,171,403, dated February 8, 1916, which clutch with reduction gearing 81 may be enclosed in a casing 82, which may carry the aforesaid stud 76 around which the roller 71 revolves and which stud is spaced from the driven clutch-shaft 83, for arrangement of the parts as indicated. Said shaft 83 may be connected to the roller-carrying plate 77 by a pinion 84, fast to the shaft 83, and a meshing pinion 85, fast to the plate 77.

Each computing wheel 40 has fastened thereto a pinion 88. As seen in Figure 3, the pinions 88 may mesh with racks 89 formed at the forward ends of the pin-bars 41, or, as seen in Figure 4, the pinions may be driven by said racks 89 through intermediate pinions 90, which may be permanently in mesh with the racks 89. As indicated in Figures 1 and 5, the computing wheel pinions, and hence the computing wheels, are normally disengaged from both the pin-bar racks 89 and the intermediate pinions 90. Direct engagement of the computing wheels with the racks 89 causes them to revolve clockwise during a forward movement of the pin-bars 41. On the other hand, if the computing wheels be driven through the intermediate pinions 90, during said forward movement of the pin-bars 41, their rotation will be counterclockwise. One direction of rotation of the computing wheels may be for addition, and the opposite direction may be for subtraction. According to the arrangement of the dial-wheel numbers, as herein indicated, the clockwise rotation of the computing wheels, when directly driven by the racks 89, corresponds to addition, and the counterclockwise rotation of the wheels, when driven through the intermediate pinions 90, corresponds to subtraction.

To shift the computing wheels 40 either downwardly for engagement with the register-bar racks 89, or rearwardly for engagement with the intermediate pinions 90, said wheels 40, independently rotatable on a spindle 91, are retained with said spindle in a shiftable frame 92 having side plates 93 spaced apart so that the ends of said spindle 91 may be journaled therein. Said side plates 93 may be spaced apart by a cross-member 94, and by the spacing afforded by the series of computing wheels and the hubs or collars 95 adjacent to the outer computing wheels. The computing-wheel frame 92 is held against lateral displacement between fixed plates 96, which may be secured to, and project upwardly from a front cross-member 97 of the computing-mechanism framework, said cross-member 97 serving with a rear cross-member 98, Figure 3, to space apart the aforesaid side members 66 of said framework.

Between forwardly-extending projections at the ends of said front cross-member 97, there may be journaled a rock-shaft 99, as indicated in Figures 1, 2 and 5. Fast to said shaft are rearwardly-extending arms 100, one for each register of the computing mechanism. The end of each arm 100 has a slot 101 embracing the cross-member 94 of a computing-wheel frame 92, said slot in the normal position of said arm 100 extending parallel to the direction in which said frame 92 is shifted to engage the computing wheels 40 with the intermediate pinions 90. The fixed plates 96 are also each provided with a similarly parallel slot 102, Figure 5, said slots 102 in the pair of fixed plates 96 co-operating with the slot 101 in the arm 100 to guide the computing-wheel frame 92 rearwardly, said frame 92 having to this end trunnions 103, Figure 2, which project from the side plates 93 of the computing-wheel frame and fit the slots 102. Besides being shiftable rearwardly for engagement of the computing wheels with the intermediate pinions 90, the computing-wheel frame may also be swung about said trunnions 103 by rocking the shaft 99 to thereby swing the computing wheels downwardly for direct engagement with the register-bar racks 89.

Shifting of the computing-wheel frame 92 rearwardly along the slots 101, 102 is accomplished by rocking a shaft 104 to which are fastened arms 105, which may be connected to the trunnions 103, as by slotted ends 106 of said arms 105, and which slotted ends embrace the trunnions 103, which may project beyond the fixed plate 96.

Preparatory to the forward movement of the register-bars 41, the computing wheels are brought into engagement with either the register-bar racks 89 or the intermediate pinions 90, and similarly, preparatory to the return movement of the register-bars, the computing wheels are disengaged again so as not to be reversed by the return movement of said register-bars.

The engagement and disengagement of the computing wheels, and hence the operation of either the rock-shaft 99 or the rock-shaft 104 is effected during an initial portion of both the advance movement of the cross-bar 60 and of the return movement of said cross-bar; the parts being so proportioned and arranged that during said initial portions of the cross-bar advance and return movements the register-bars are not engaged. To this end, there is connected to the reciprocatory train which drives the cross-bar 60 back and forth a device for selectively rocking either the rock-shaft 99 or the rock-shaft 104 by operation of the reciprocatory cross-bar train. Said device includes a fully rotatable cam 108 connected to said cross-bar train by means which will be presently described. Said cam 108, rotating through operation of the reciprocatory cross-bar train in a clockwise direction, vibrates a follower-arm 109 having follower-rolls 110 engaging opposite sides of said cam 108 so that said arm is positively vibrated by said cam in either direction. Said arm 109 is loosely mounted on said rock-shaft 104 for selective connection with the latter.

Vibration of the cam-follower arm 109 may or may not be effective to rock the shaft 104, according to whether or not operative connection is effected between said cam-follower arm 109 and said shaft 104. To this end, there is provided alongside of said follower-arm 109 a slide 111 which may be guided for movement lengthwise of said arm by having an elongate hole 112 embracing the rock-shaft 104, and by having a pin 113 which slides in a slot 114 of the cam-follower arm 109 and is spaced from the rock-shaft 104. Adjacent said slide 111 is an arm 115 fast to the rock-shaft 104 and having at its end a notch 116 aligned with a tongue 117 of said slide 111. By moving the slide 111 upwardly, said notch 116 and tongue 117 interlock, thus enabling the cam-follower arm 109 when vibrated to rock the shaft 104. Conversely, when the slide 111 is lowered and the tongue 117 thereby withdrawn, vibration of the cam-follower arm 109 is ineffective to rock the shaft 104.

A similarly engageable and disengageable connection between the cam-follower arm 109 and the rock-shaft 99 includes an arm 118 fast to said rock-shaft 99 and connected to the cam-follower arm 109 by a link 119. Said link 119 may be shifted about its pivotal connection to the arm 118 so that the opposite end connected to the cam-follower arm 109 may be operatively connected to, or disconnected from, the latter. To this end, said other end of the link 119 may have a slot 120 which may embrace a stud 121 projecting from the cam-follower arm 109. Said slot 120 extends transversely of the direction of movement which said stud 121 takes as the cam-follower arm 109 is vibrated, and therefore when the link 119 is in such position that the sides of said slot 120 embrace said stud 121, see Figures 21 and 22, the rock-shaft 99 will be actuated by vibration of the cam-follower arm 109. The slot 120 may be terminated as by a cross-slot 122 designed to clear the cam-follower arm stud 121 when the link is in another position, see Figures 23 and 24, thereby to render vibration of the cam-follower arm 109 ineffective to rock the shaft 99.

A control-lever 123, fulcrumed on a stud 124, which may project from the right computing-mechanism frame side member 66, is utilized to selectively control the positions of the slide 111 and the link 119, to the end that when said slide 111 or link 119 is in effective position the other shall be in ineffective position. Said control-lever 123 to this end has an arm 126 having a pin-and-slot connection 127 to the link 119, and also includes another arm having a pin-and-slot connection 128 to the slide 111, said pin-and-slot connections affording free rock-shaft-actuating movements of the link 119 and the slide 111.

With the arrangement of the slide 111, link 119 and control-lever 123, as indicated, rotation of said control-lever 123 clockwise is effective to displace the slide 111 downwardly and the link 119 upwardly, thereby rendering the slot 120 effective as a connection between the cam-follower arm 109 and the link 119, and conversely rendering the slide 111 ineffective as a connection between said cam-follower arm 109 and the arm 115 of the rock-shaft 104.

With the lever 123 displaced clockwise, the rock-shaft 99 will be actuated by vibration of the cam-follower arm 109, and hence the computing-mechanism frame 92 will be swung about its trunnions 103, see Figure 22, to thereby bring the computing wheels into and out of direct engagement with the register-bar racks 89, as aforesaid, for addition.

Counterclockwise displacement of the control-lever 123, see Figures 23 and 24, raises the slide 111 to establish connection between the cam-follower arm 109 and the rock-shaft 104, as aforesaid, the link 119 being concomitantly displaced so that the slot 120 therein is ineffective as an operative connection. As the link 119 is thus displaced in the latter case, a notch 130 of said link may interlock with an extended portion 125 of the fulcrum-stud 124 on which the control-lever 123 is pivoted, the rock-shaft 99 being thereby fixed and held against accidental displacement to insure proper guidance of the computing-wheel frame 92 in its movement, see Figure 24, toward and from the pinions 90, and which movement it will be understood is predetermined by said displacement of the control-lever 123 counterclockwise. The point at which the link 119 is pivoted to the arm 118 may be adjustable in respect to its distance from the center of the shaft 99, as indicated by the slot 131 in said arm 118, thereby to vary the extent to which said shaft rocks.

The rock-shaft 104 may be journaled between the computing frame side members 66. The fully-rotatable cam 108 is fast to a shaft 133 also journaled between said side members 66. The different parts actuated by the cam 108, as just described, and controlled by the position of the control-lever 123, constitute state-determining means for predetermining an additive or subtractive state of the computing mechanism. The control-lever 123 may normally be in such position, see Figure 23, that the computing mechanism is normally in an additive state.

In the preferred arrangement of the computing mechanism, the state-determining means, including the control-lever 123, are at the right side of the computing mechanism, and a subtraction-key 134 is at the left side of said mechanism, and is at the end of a key-bar 135 guided for endwise movement above and along a top plate 136 enclosing the computing mechanism.

The substraction-key 134 and its bar 135 are held in normal forward position by a spring 137, and in which position an offset portion 138 of the bar bears against a boss 139 in which the rear end of said bar 135 is guided. The forward end of said bar is guided by the bearing which the key 134 may have in a plate 140, which encloses the front of the computing mechanism. Said plate 140 has sight-holes 141 through which the numerals on the different dial-wheels may be seen.

Rearward movement of the subtraction-key 134 and its bar 135 is utilized to displace the state-control lever 123 counterclockwise. To this end the bar 135 may be connected as indicated to a cross-lever 143 pivoted upon the computing-mechanism top-plate 136 at 144, Figure 2, and extending from said subtraction-key bar 135 at the left side of the computing mechanism to the opposite side of the mechanism where the control-lever 123 is located. At said opposite side the cross-lever 143 is bent downwardly and passes through an opening 145, Figure 1, of said top-plate 136, for connection with a vertical arm 147 of the control-lever 123, the downwardly-bent portion 148 of the cross-lever 143 being connected to said control-lever vertical arm 147 by a link 149.

For holding the subtraction-key and its bar 135 in its rearward position to insure that the subtractive state of the computing mechanism is not accidentally upset, a latch-device such as is disclosed in the aforesaid patent to Minton may be used to hold the subtraction-key in its subtracting or rearward position. Said device includes a plunger 150 retained in the top-plate 136 and having a head 151 against which a stud 152, projecting from the side of the subtraction-key bar 135, may be caught when the plunger 150 is pressed in, it being understood that said plunger is pressed in only after the subtraction-key is pressed in. A spring 153, secured to the subtraction-key bar 135, tends to press the plunger 150 outwardly again when the head 151 thereof is interlocked with the stud 152 and bears upon said head through a pin 154. A slight rearward movement of the subtraction-key bar 135 by the finger after it has been pressed in and caught by said plunger-head 151 enables said spring 153 to push said plunger-head aside, and by withdrawing the finger the restoration of the subtraction-key bar 135 through its spring 137 is effected with a consequent restoration of the control-lever 123 to its normal additive position.

The means whereby the reciprocatory movements of the cross-bar-operating train are translated into a full revolution of the cam 108 will now be described.

The shaft 133, at one end of which the cam 108 is fastened, has at its opposite end a double clutch-device 155, whereby movement of the cross-bar train in one direction results in partial revolution of the shaft 133, and whereby the movement of said train in the opposite direction completes the full revolution. To this end the shaft 68 of the cross-bar-operating train has fastened thereto an extra gear-sector 156 spaced from the gear-sector 69 at the left end of said shaft 68. The two sectors 69, 156 are respectively connected to sectors 158, 159 loosely mounted on the shaft 133. Said sectors 158, 159, each of which always moves oppositely to the other, form driving members of said double clutch 155 which become alternatingly effective on the movement of said cross-bar train first in one direction and then in the opposite direction.

The sector 69 on the shaft 68 rotates the sector 158 through the pinion 70, rack 65, and an additional pinion 160. The other sector 156 on the shaft 68 rotates its sector 159 directly, and hence always in opposite direction to the rotation of sector 158.

Referring to Figures 18, 19 and 20 each sector 158, 159 may have one side recessed as by a circular groove 162 to form a single clutch-tooth 163 within said side of the sector. Each clutch-tooth engages a clutch-pin 164 retained between disks 165 confined between said sides of the sectors 158, 159 and keyed to the shaft 133 as by a key 166. One clutch-pin projects into the groove 162 of sector 158 and the other clutch-pin projects into the groove 162 of sector 159, the two clutch-pins being preferably arranged at points diametrically opposite. Each clutch-pin 164 has a shoulder 167, Figure 18, normally bearing against one end of a recess 168, in which is also retained a spring 169 bearing on said shoulder and tending to push said clutch-pin outward. The recesses 168 are counterborings of holes 170, Figure 20, in which the extremities of the clutch-pins are guided.

The trailing sides of the clutch-teeth 163 may be beveled, as indicated by shade-lines 171, Figures 19 and 20. The tips of the clutch-pins 164, which engage the clutch-teeth 163, may be similarly beveled, as indicated in Figure 18.

Referring to Figure 19: With the required rotation of the shaft 133 in the clockwise direction indicated by its arrow, it is obvious that the sector 159 will rotate said shaft in said direction during advance movement of the sectors 69, 156, indicated by their arrows. During this shaft-rotating movement of the sector 159, the lower pin 164 and clutch-tooth 163, as seen in Figure 19, are in driving engagement. The clockwise rotation of the upper clutch-pin, seen in Figure 19, and the contrariwise rotation of the clutch-tooth 163 of the sector 158, causes said latter clutch-pin and tooth, during the advance movements of the sectors 69, 156 to first draw apart as they move around their circular path and then to come together again and override one another to reassume their driving engagement at a point diametrically opposite from their starting point, the relative proportions of the sectors being designed to effect one-half revolution of the sectors 158, 159 by each stroke of the sectors 69, 156. Reversal of the movements of the sectors 69, 156 will now have the effect of causing the sector 158 to drive the shaft 133, the clutch-tooth 163 of the sector 159 and its clutching-tooth pin 164 now first receding from one another, and then crossing and overriding each other again to reassume their driving relation as the revolution of the shaft 133 is thus completed by the sector 158.

The crossing, one past the other, of a clutch-pin 164 and a clutch-tooth 163 is rendered possible by reason of the aforesaid bevel 171 at the trailing side of the clutch-teeth and the plunger-like character of said clutch-pin which is displaceable transversely of the disks 165 and is restored to its normal effective position by its spring 169. The double clutch 155, just described, may be located longitudinally of the shaft 133 by a collar 172 adjacent one side of the clutch and a boss 173 of the framework side member 66 adjacent the other side of the clutch. The pinions 70, 160 are also mounted on said side members 66.

As already stated, the levers 59 on the general-operator cross-bar have register-bar engaging fingers 58 for pushing the register-bars forward. How said levers 59 and their register-bar engaging fingers operate to advance the register-bars 41 extra unit-spaces for carrying, will now be explained. Said levers 59, of which there is one for every register-bar, may be mounted on a common fulcrum-rod 175, and there may be one such fulcrum-rod for every set of register-bars of the computing mechanism retained between ears 177 of a bracket 176 secured to the cross-bar 60, Figures 1 to 4, said ears projecting downwardly and forwardly from said cross-bar. The levers 59, individually rockable on their fulcrum-rods, are spaced apart and located, as by collars or hubs 178, Figure 2. The register-bar engaging fingers 58 of said levers 59 are aligned with the pins 42 of their respective register-bars, and may be formed by tabs bent at right angles to said levers.

The carrying of a tens value from one computing wheel to a wheel of next higher denomination is, according to the present invention, effected by advancing the register-bar for said higher wheel an extra unit-space, the extra advance being effected by causing the lever 59 to be rocked counterclockwise from the position seen in Figures 6 or 8 to the position seen in Figures 7 or 9. As seen in Figures 6 and 8, the register-bar engaging fingers 58, backed by the cross-bar 60, advance a register-bar by engaging a depressed pin 42. The advance of the cross-bar 60 and the fingers 58 thereon is always to the same extent, and the extent of advance of a register-bar therefore depends upon which index-pin is depressed. If the "0" pin, which is the first pin from the front of the machine, is not displaced from its normally-depressed position by the setting of a higher pin, the register-bar will not be advanced, because the position which the cross-bar, with the corresponding finger 58 bearing thereagainst, reaches at the end of its advance movement is such that said finger 58 just touches the depressed "0" pin. If a "1" pin is depressed, the register-bar will be advanced until said "1" pin is in the position from which the "0" pin moved in such advance of the register-bar. Similarly, by depression of a higher pin, the register-bar will be advanced until said higher pin is in the position which the "0" pin left in said advance.

Thus, it will be seen that, irrespective of the value of the depressed pin, the depressed pin always reaches the same position, and that it is therefore feasible to provide stops which will prevent overthrow of the register-bars as they reach the ends of their respective advance movements, and that said stops will be effective for any extent of said advance movements as determined by the values of the depressed pins 42. A stop 179 for each register-bar is therefore provided and is caused to abut the forward side of the depressed pin as a register-bar carrying said pin reaches the end of its advance position.

Two conditions govern the application of the stops 179, one condition being that said stops must be individually shiftable to permit an extra carrying advance of their respective register-bars, the other condition being that said stops, when the computing mechanism is in its normal condition, that is to say, when the register-bars are not being advanced to accumulate a number, must be sufficiently removed from the normally depressed "0" pins to permit the aforesaid slight advance of the register-bars seriatim during the indexing of the register-bars.

To these ends, the register-bar stops 179 may be formed on the rear ends of elongate bars 181, which are to be shiftable simultaneously from a normal position, indicated in Figure 1, wherein the stops 179 are far enough removed from the depressed "0" pins, as seen in Figure 1, to permit the aforesaid seriatim advance of the register-bars, to the position indicated in Figures 6 and 8, in which latter position the stops 179 may abut the depressed pins of the advanced register-bars or the "0" pins of the register-bars that are not advanced. From said latter position, the bars 181, and hence the stops 179, are to be individually movable in a forward direction to permit an extra carrying advance of the corresponding register-bars, the forward carrying movement of the bars 181 being limited, however, so that the stops 179 are also effective to prevent overthrow of the register-bars when said register-bars carry. The forward carrying movement of any bar 181 is also utilized to effect, as will be explained, a carrying displacement of the corresponding lever 59 and its register-bar engaging finger 58.

To these ends, the bars 181 are urged forward by individual springs 182, but are normally latched in non-carrying positions over a transverse latch-bar 183, each bar 181 having a latching edge 184, which normally abuts the rearward edge of said bar 183. The several bars 181 are pivotally connected at their rearward ends to upstanding arms 187 of levers 185 of the first order individually rockable on a fixed fulcrum-rod 186. Arms 188 of said levers 185 extend, in the normal positions of said levers as seen in Figure 1, downwardly and rearwardly. To effect rearward movement of all the bars 181 to bring the stops 179 from the positions seen in Figure 1 to the position seen in Figure 6 or 8, in which latter position the stops are effective to prevent overthrow of the register-bars, the latch-bar 183, together with all the bars 181 latched thereover, is advanced rearwardly during the advance movement of the cross-bar 60. As the bars 181 are so moved simultaneously, their levers 185, mounted on the fixed fulcrum-rod 186, are rotated clockwise, so that the arms 188 of said levers 185 are shifted from the position indicated in Figure 1 to the position indicated in Figure 6 or 8. Said latter position of the arms 188 is such that pins 190 therein just abut downwardly-extending arms 191 of the corresponding levers 59 on the cross-bar 60 when the corresponding register-bars register a non-carrying advance, as indicated in Figure 6 or 8. From Figure 6 or 8, it will be seen that, with the arm 191 abutting the pin 190 and the register-bar engaging finger 58 abutting the cross-bar 60, and the bar 181 latched over the bar 183, a register-bar whose depressed pin 42 is closely confined between the stop 179 and finger 58 is secured not only against overthrow, but is also secured against rebound.

Referring to Figures 6 and 8, it will be further seen that upward displacement of the forward end of one of the bars 181 will cause said bar to move forwardly under the pull of the spring 182 and an additional spring 193 which may bear directly against the lever 185, as indicated.

As a bar 181 thus released from the latch-bar 183 moves forwardly, it rocks its lever 185 counterclockwise to the position seen in Figures 7 and 9, and which position may be determined as by abutment of an edge 180 of said bar with a transverse bar 195 which may also have slots 196 to guide the forward ends of the bars 181. It will be evident that a lever 185, thus rocked counterclockwise by release of its bar 181, will also cause a corresponding lever 59 on the cross-bar 60 to be rocked counterclockwise, thereby causing the register-bar engaging finger 58 on said lever 59, and hence the corresponding register-bar itself, to be advanced in respect to said cross-bar 60. Thus each register-bar may receive an extra movement depending upon the release of a bar 181. To prevent the levers 59 from falling into a disabling position when not engaging an index-pin 42, as, for example, when the cross-bar 60 is fully returned, each lever 59 may have an arm 197 to limit its counterclockwise movement, as is indicated by the abument of said arm with the bracket 176 attached to said cross-bar 60.

The release of a bar 181, as aforesaid, is to be effected every time a computing wheel passes its carrying point, and each computing wheel has therefore, projecting from its periphery, a carrying tooth 200. On account of the different positions of the computing wheels in addition and subtraction, the carrying teeth 200 of the several wheels operate to release the bars 181, preferably through intermediate carrying levers 201 individually rockable on a fulcrum-rod 202 supported between the side plates 93 of the computing-wheel shift-frame 92, and spaced and located on said rod 202 as by collars or hubs 199, Figure 5. Each carrying lever 201 has a cam-shaped arm 203 arranged so that said carrying lever may be rocked by the carrying tooth 200 in either direction of rotation of the computing wheel. As a carrying lever 201 is rocked, an end of an arm 204 thereof moves upwardly against and displaces the forward end of a corresponding bar 181, and thus releases said bar 181 from the latch-bar 183.

The proportions of the carrying levers 201, the location of their fulcrum-rod 202, and the location of the ends of the arms 204 of said levers, are so arranged that said ends of the arms 204 describe an arc or line when the computing-wheel shift-frame 92 is swung around its trunnions 103 for engaging the computing wheels directly with the register-bar racks 89, which is substantially the same as the line along which said ends of the arms 204 move as the computing wheels are shifted rearwardly with said frame for engagement with the intermediate pinions. Thus the carrying levers 201 are effective in either adding or subtracting position of the computing wheels 40, to release their respective bars 181.

A carrying train from any computing wheel to the register-bar of the computing wheel of next higher denomination includes the carrying lever 201 actuated by the former computing wheel, the bar 181, releasable by said carrying lever 201, the lever 185, connected to the rear end of said bar 181, and the lever 59, controlled by the latter lever 185, the register-bar engaging finger 58 of said lever 59 being aligned with the pins 42 of the register-bar of the computing wheel of said next higher denomination. Thus, one end of said train is the arm 203 of the carrying lever 201, and is adjacent the computing wheel of lower denomination, and the other end of said train is the register-bar engaging finger 58 for the register-bar of next higher denomination. The required offset of said ends of the train may be effected by forming and arranging the parts thereof as indicated in Figures 2 and 5. As indicated in Figure 2, the main body of the carrying lever 201 may extend along the plane of rotation of the carrying tooth 200, and may have at the end of its arm 204 a bent-over tab 226 for engaging the bar 181 which extends from said tab 226 to the point of its connection with the lever 185, said lever 185 being disposed so that its pin 190 is in line with the arm 191 of the lever 59, and which lever 59 has its register-bar engaging finger 58 in line with the pins of the register-bar of said next higher denomination. The rear end of the bar 181 is bent over to form the overthrow-preventing stop 179, which, as seen in Figure 2, is in line with the pins of the register-bar of said higher denomination.

The forward part of the bar 181 extends parallel to the register-bars, as seen in Figure 2, and is slightly to the left of the body-portion of the corresponding carrying lever 201, for alignment with the aforesaid carrying-lever tab 226. The rear part of the bar 181 is offset toward the left from the front part, as by bands made at c and d, so that said rear part may be connected to the lever 185 by a pivot-screw 228. The levers 185, individually rockable on their fulcrum-rod 186, may be spaced and located on said rod as by hubs or collars 229. Although the units register-bar never carries, it is nevertheless provided with a bar 181, a lever 185 and a lever 59, the latter having its register-bar engaging finger 58, inasmuch as these parts also prevent overthrow and rebound of the units register-bar. No carrying train extends from the computing wheel of highest denomination, which is the first wheel from the left of the register.

In most cases, the levers 59 are rocked positively by the positively-driven movement of the cross-bar 60 itself when carrying is to be effected and therefore an extra carrying advance of a register-bar is effected positively. That is to say, in most cases carrying bars 181 will have been released, and the levers 185, connected thereto, will have been rocked before the cross-bar 60, with its register-bar engaging levers 59, effects contact of the arms 191 of said latter levers with the pins 190 of the arms 188 of levers 185. Thus, said arms 188 form interponents which, by the release of their respective bars 181, are thrust into the path of the advancing cross-bar levers 59 on the cross-bar 60. It will be seen, therefore, that as the arms 191 of the cross-bar levers encounter the pins 190, thus thrust into said path, the cross-bar levers 59 will be caused to rotate counterclockwise to an extent equivalent to advancing their register-bars an extra unit-space, and which extent, it will be understood, may be determined by suitable proportioning and arrangement of the parts as illustrated in the drawings. In those cases where a carrying advance of a register-bar is effected, after said register-bar has reached its advanced position, as indicated in Figure 6 or 8, the necessary carrying displacement of the parts involved is effected by the power afforded by the springs 182 and 193.

The lever 185, whose arm 188 is thus thrust into the path of the advancing cross-bar lever 59, is to be stabilized against counter-rotation while it co-operates to rock said cross-bar lever 59, and the latter lever 59 is also to be locked against counter-rotation after it has been rocked to the position of Figure 7 or 9. To this end the arm 191 of the lever 59 has an edge 230 extending in such direction relatively to the fulcrum of the lever 185, and clearly indicated in Figures 6 and 8, that said lever 185, while it is being rocked by the springs 182, 193, may correspondingly rock the cross-bar lever 59. At the end of this rotation of the two levers 59, 185, the pin 190 of the lever 185 arrives opposite a scooped-out portion 231 of said edge 230. A point or hump 232, at the intersection of the edge 230 and its scooped-out portion 231, affords such point of contact with the pin 190 as the lever 59 reaches said pin after the latter has already been thrust out, as aforesaid, that the lever 59 is rocked counter-clockwise while the cross-bar 60 is completing its advance movement.

As indicated in Figure 7, said point or hump 232 approaches and makes contact with the pin 190 on the dot-and-dash line 233. In the ensuing rocking of the lever 59 to the position shown in Figure 7 or 9, as the point or hump 232 is thus arrested while the cross-bar completes its advance, it will be seen that the line of reaction afforded by the lever 185 is substantially through the fulcrum-center of said lever, and hence there is substantially no tendency to rock said lever contrariwise, and therefore there is substantially no tendency to relatch the bar 181. As the lever thus, in the latter case, is rocked to the position shown in Figure 7, the scooped-out portion 231 settles against the pin 190. Since said portion 231 may, at its final point of contact with the pin 190, be substantially perpendicular to the aforesaid line of reaction through the fulcrum-center of the lever 185, as is clearly indicated in Figure 7 or 9, the lever 59 is also secured against counter-rotation after it reaches said position, as in Figure 7 or 9, and hence there is no tendency to rebound of the register-bar, even when said bar receives an extra advance for carrying.

The slotted transverse bar 195, which serves as both stop and guide for the bars 181, may also have slots 207, in which the front portions of the register-bars 41 are guided. Said register-bars may be guided at their rear portions in slotted transverse plates 208. Said transverse bar 195 may be retained between the fixed plates 96, which retain the computing-wheel frame 92 against lateral displacement. Each pair of said fixed plates may have rearward extensions 209, between the ends of which may be retained the fixed fulcrum-rod 186 of the levers 185.

Each of a pair of said fixed plates 96 may have a slot 210, the opposite slots of the pair of plates serving to retain the latch-bar 183 whose ends may be guided in said slots, as indicated in Figure 5. The shifting of said bar back and forth in said slots 210 is effective not only to bring the register-bar stops 179 into and out of their stopping positions, as aforesaid, but the forward shifting of said latch-bar 183 is also effective to cause the relatching of those bars 181 which have been released. With the position of the parts as seen in Figure 7 or 9, in which the released bars 181 abut their transverse guiding bar 195, it will be evident that shifting of the latch-bar 183 forward, that is, toward the left, to the position indicated in Figure 1, is effective to relatch the released bars.

Means whereby the latch-bar 183 is thus shifted back and forth include a rock-shaft 212, which may be journaled in the computing frame side members 66 for actuation by a cam 213, which may be secured to the sector 156 that is on the coupling shaft 68 of the cross-bar-operating train. Said cam 213 may have an ear 214 whereby it may be attached to said sector 156, as indicated, said cam 213 being thus keyed to the shaft 68 which is rocked to and fro during operation of the cross-bar train. Oscillation of the cam 213 is transmitted to the rock-shaft 212 by a follower-arm 215 having branches 217, which may engage the cam 213 on opposite sides of its center of rotation, so that the arm 215 and the rock-shaft 212 connected thereto are positively rocked in opposite directions.

Said rock-shaft 212 may have fast thereto a pair of arms 218 connected to the latch-bar 183 by connecting rods 219. The connecting rods 219 may extend adjacent the inner sides of the fixed plates 96 for connection near the ends of the latch-bar 183, the connecting-rod arms 218 being located accordingly. The contour of the cam 213 may be so arranged that the bars 181, having the register-bar stops 179, are shifted forwardly gradually, but soon enough to bring the stops 179 into effective position before a register-bar reaches the end of its advance movement, and similarly the return of the latch-bar 183 is also effected gradually through said arrangement of the contour of the cam 213, the return of the latch-bar 183, and consequently of the bars 181 not commencing, however, any sooner than say, the time at which the returning cross-bar picks up the farthermost advanced register-bar.

The springs 182 for the bars 181, may be anchored to a plate 220, which may be secured to the latch-bar 183. Attachment of the connecting rods 219 to the latch-bar 183 may be effected by interlocking slots formed at the ends of said latch-bar and the connecting rods, as indicated in said Figure 5. The connecting rods 219 may be prevented from dropping away from the latch-bar 183 by resting upon projections 221 afforded by the ends of the spring-plate 220. The individual springs 193 for the levers 185 may react against a rod 222, which may be supported between the extensions 209 of the fixed plates 96, and said springs may surround the hubs 229 of said levers 185.

To ensure proper relative alignment of the teeth of the computing-wheel pinions 88 with the teeth of the intermediate pinions 90 and of the register-bar racks 89, so that the computing-wheel pinions may properly mesh with either of said racks 89 or pinions 90, there is provided an aligning bar 235, which may be dropped into the teeth of the intermediate pinions 90 to align and locate the teeth of said pinions, and consequently the teeth of the register-bar racks 89.

Alignment and location of the teeth of the computing-wheel pinions 88 are secured by individual detents 236, which fit the tooth-spaces of said computing-wheel pinions 88 and are interlocked therewith when the computing wheels are in their normal non-computing position, see Figure 1. As indicated in Figures 3, 4, 6 and 7, the computing-wheel pinions 88 are released from the control of their respective detents 236 by receding from the latter as they become engaged with the register-bar racks 89, the detents 236 remaining stationary. As the computing-wheel pinions cannot recede from their respective detents 236 in a rearward movement of the computing wheels, the detents 236 themselves are caused to recede from their respective pinions 88.

To this end, said detents 236 are formed at the ends of prongs 237 projecting forwardly to reach individually between the computing wheels from a cross-member 238 to form a comb-like plate secured to a rocker-bar 239 pivotally supported at 240 between the side plates 93 of the computing-wheel shift-frame 92. Said comb-like plate may have at the ends of its cross-member 238 forwardly-extending arms 241, having at their forward ends cam-noses 242 bearing upon the fixed plates 96, between which said computing-wheel shift-frame is retained. Each of said forwardly-extending arms 241 may have sideward projections 234 for attachment of a spring 243, which pulls the cam-nose 242 of said arm 241 against the edge of the adjacent fixed plate 96. By the rearward movement of the computing-wheel shift-frame 92 for engagement of the computing wheels with the intermediate pinions 90, said cam-noses 242 encounter cam-noses 245 formed on the edges of the fixed plate. Thus in the rearward movement of said shift-frame 92, the detents 236 are displaced upwardly as the noses 242 ride over the noses 245 of the fixed plates 96 and thereby swing said detents and their rocker-bar about the pivotal support of the latter at 240. Conversely, the forward shift of the computing-wheel shift-frame 92 causes the detents 236 to engage the computing-wheel pinions 88 again. The rocker-bar 239 has downwardly-extending ears 244 for making the pivotal connection 240 with the side plates 93.

In the two-register mechanism herein shown, there is preferably one aligning bar 235 for each register. Each aligning bar 235 may, in order to be swingable toward and from the teeth of the intermediate pinions 90, have side arms 247 for pivotal connection to the fixed plates 96, as by pivot-screws 248. Said arms 247 may have extending therebetween a cross-shaft 249, around which may be wound a torsion spring 251, arranged to urge the aligning bar toward the teeth of said intermediate pinions 90. The movements of each aligning bar 235 into and out of engagement with the intermediate pinions 90 are controlled by a rotatable cam 252, a latch 253, and a cam and latch-engaging finger 254, which may be bent, as indicated in Figures 2 and 5, from the inner arm 247 of each aligning bar 235. Each aligning bar 235 has its own cam 252 and latch 253, and the disposition of said cams 252, latches 253 and the co-operating fingers 254 of their respective aligning bars 235 may be as indicated in Figures 2 and 5. The cams 252 are fast to the shaft 133, which, as hereinbefore explained, receives a full revolution for each full operation of the operating train of the cross-bar 60.

When the computing mechanism is not being operated to accumulate a number, the aligning bars 235 and related parts are in the positions shown in Figure 10, from which it will be seen that each finger 254, resting upon the cam-portions 257, will drop off said portion immediately after the cams 252 begin rotating. In other words, the aligning bars 235 will drop into the teeth of the intermediate pinions 90 substantially as soon as the cross-bar 60 and its operating train which drives said shaft 133 begin their advance; the positions of the parts will then be as indicated in Figure 11. Concomitantly with the start of the advance movement of said operating train and the dropping of the aligning bars 235 into position, the computing wheels are started toward either the racks 89 or intermediate pinions 90 for engagement therewith, as already explained.

As soon as the teeth of the computing-wheel pinions are sufficiently within the teeth of the racks 89 or intermediate pinions 90, withdrawal of the aligning bars 235 may be begun and substantially completed before any pinion 90 commences to rotate, by rises 258 of their cams 252. Each cam 252 has a portion 250 high enough to raise each finger 254 so that the adjacent latch 253 may snap into position under said finger, as shown in Figure 12, after further rotation of the cams 252, said latch having in the meantime been put under the tension of a spring 260, to press against the side of said finger and be ready to snap thereunder.

For joint control of the two latches 253 by said spring 260 and other devices to be explained, they may be joined as by a cross-bar 261 and are then rockable together on the shaft 133. One of the latches 253 may have a downwardly-extending arm 262 on which the aforesaid spring 260 may pull at the proper time. There is accordingly fastened to the rock-shaft 212 an arm 263, Figures 1, 12 and 13. Said latch-arm 262 may have pivotally connected thereto and extending rearwardly therefrom toward said rock-shaft arm 263 a link 264 having a slot 265 embracing a pin 266 projecting from said arm 263, and, normally, as seen in Figure 10, bearing against the forward end of said slot 265. One end of the spring 260 may be attached to said pin 266 and the other end, in order to pull upon the latch-arm 262, may be attached to said link 264.

Rotation of the rock-shaft 212 in a clockwise direction as driven by its operating cam 213, and hence counterclockwise rotation of the latches 253, is preferably so timed that the gap 267, Figure 10, between each latch and finger is not taken up before the fingers 254 have dropped off the cam-portions 257.

When the cross-bar 60 and its operating train have completed their advance stroke, the cam-shaft 133 will have been rotated one half revolution, and the aligning-bar fingers 254 will then be resting upon their latches 253 ready upon withdrawal of said latches to drop into notches 269 of their cams 252, as seen in Figure 13, said notches being now in position under said fingers. It being understood that the cam-shaft 133 is stationary while the driving roller 71 of the cross-bar operating train passes the curved face 75 of the link 72, the purpose of providing the latches 253 becomes apparent, inasmuch as the withdrawal of said latches by said roller 71 as it reaches a certain position affords a closer way of regulating the time of release of the aligning bars 235 at the end of the hereinbefore-mentioned carrying interval associated with said curved face 75 than would be afforded by the cams 252 themselves. To enable the driving roller 71 by its movement to control the latches 253, there extends rearwardly from the latch-arm 262 a link 270 for connection to an arm 271 which, with another arm 272, spaced therefrom by a collar 273, forms a bell-crank lever 275 actuable by said roller 71 as the latter passes a predetermined point.

The bell-crank lever 275 may be pivotally mounted upon the rear cross-member 98 of the computing-mechanism framework, Figures 1, 2 and 14. The arm 272 of said bell-crank lever 275 may have a cam-nose 276 normally lying in the path of the operating roller 71 in such position that said roller engaging said cam-nose 276 has displaced the bell-crank lever 275 at that point in the revolution of said roller when it is about to commence the retraction of the link 72 of the cross-bar-operating train. Thus the latches 253 are withdrawn and the aligning bars 235 are consequently again dropped into position just as the cross-bar 60 commences its rearward movement. The initial period of cross-bar return movement, before the rear edge of said cross-bar picks up the farthermost advanced register-bar by engaging a projection of said register-bar, is utilized for withdrawing the computing wheels either from the register-bar racks 89 or the intermediate pinions 90, depending upon with which said computing wheels are engaged.

The aligning bars 235 may be withdrawn again as the computing-wheel pinions 88 come under the control of their respective detents 236 again, and such withdrawal is now effected by cam-rises 278 of the cams 252, rotation of which is resumed when the cross-bar begins its return stroke and said withdrawal is completed soon enough to permit reverse rotation of any intermediate pinion 90. The cam-rises 278 each merge into dwell 279 which includes the cam-portion 257 upon which the finger 254 of the aligning bar 235 finally rests, as seen in Figure 10, the cams 252 rotating during the return stroke of the cross-bar-operating train to the position seen in said Figure 10.

To detent the cam-shaft 133, and hence the cams 252, in each of the two positions determined by each half revolution of said cam-shaft 133, there may be provided at the end of said shaft 133 a disk 280 having diametrically opposite detent-notches 281 co-operating with a spring-pressed detent-arm 282 carrying at its end a detent-roll 283 which may drop into either notch 281 to determine said positions. The detent-arm may be pivotally mounted upon the computing-frame side member 66, as indicated in Figure 2. Figure 5 shows the detent-disk 280 and its related parts in perspective, somewhat removed for the sake of clearness from their regular positions in which the disk 280 is close to the cam 108, as seen in Figure 2.

The link 270, which connects the aligning-bar latches 253 to the aforesaid bell-crank 275, operated by the driving roller 71, may have an adjustment for length as indicated at 285, Figure 14, said adjustment serving, as will be evident, to project the cam-nose 276 of said bell-crank 275 more or less into the path of the roller 71, and thus serving to determine the instant when said latches 253 release the fingers 254. During the return movement of the cross-bar operating train, the rock-shaft 212 under the influence of its operating cam 213 rotates counterclockwise so that finally at the end of said return movement the latches reassume their normal positions, as indicated in Figure 10.

Before any significant pins 42 are indexed by operation of the numeral-type keys 30, the "0" pins of the register-bars 41 are all in depressed positions. In a register-bar that has a higher index-pin indexed therein, the "0" pin is restored in the manner hereinbefore stated, and fully described in my aforesaid application, and the higher pin may itself be restored by depressing the "0" pin again. Since all higher pins must be restored and all "0" pins must be depressed at the end of each accummulating operation preparatory to indexing and accumulating a new number, and since the depression of a "0" pin restores all other pins in the same bar, all "0" pins are caused to be depressed at about the time when the cross-bar 60 approaches the end of its return movement. For such normalizing depression of the "0" pins, each "0" pin has associated therewith, as disclosed in said co-pending application, a lever 286 of the first order pivoted to the corresponding register-bar at 287. The end of one arm of said lever 286 is articulated with a notch 288, Figure 16, of the "0" pin, and the other arm 289 of said lever extends forwardly for operation by a pin-restoring bail 290 which is common to all the "0" pin-resetting levers 286 of the several register-bars of a register, there being one such restoring bail for each register. Each pin-restoring bail 290 may be fulcrumed upon, and therefore has side arms 291 loose on the fixed fulcrum-rod 186 for the various levers 185 of the aforementioned carrying devices.

Inasmuch as the register-bars move forth and back, and the pin-restoring bail 290 is mounted upon a fixed fulcrum, the restoration of the pins 42 by operation of said pin-restoring bail 290 is effected as the register-bars driven by the cross-bar 60 near the end of their return movement, the bail 290 being at such time rocked from the position seen in Figure 16 to the position seen in Figure 17. From Figure 17 it will be seen that the bail 290 thus rocked clockwise against the arms 289 of the several "0" pin-resetting levers 286, also rocks the latter levers clockwise and thereby causes depression of all the "0" pins and restoration of all higher pins that were set to co-operate in the accumulation of the last number. If during said accumulation of a "0" pin was not elevated by the setting of a higher pin in its register-bar, the pin-restoring bail 290 has, of course, substantially no effect upon the lever 286 associated with said latter "0" pin. Each pin-restoring bail 290 may have individual prongs 294 for engaging the several "0" pin-restoring levers 286, and said prongs may be formed, as indicated in Figures 5, 16 and 17, to best effect said engagement which takes place as the cross-bar 60 approaches the end of its return movement, said movement being utilized to rock the pin-restoring bails 290 clockwise.

Each pin-restoring bail 290 has, therefore, an upwardly-extending arm 295, having a pivotal and yieldable connection to a rearwardly-extending link 296 whose rear end has a hook-portion 297 engageable by the rear edge of the cross-bar, as indicated in Figure 17, from which it will be seen that as said hook-portion is thus engaged the rearward movement of the cross-bar 60 is effective through said link 296 to rock the pin-restoring bail 290 clockwise. The yieldable connection of the link 296 with the bail-arm 295 is afforded by a spring 299, connected to said link and to a stud 300 projecting from said bail-arm 295 and fitting a slot 301 of said link which co-operates in affording said yieldable connection.

By means of said yieldable connection, the pin-restoring bail 290 may be brought to its full pin-restoring position as determined by abutment with the rod 222, Figure 17, before the cross-bar 60 reaches the end of its return-movement. The spring 299 of said yieldable connecting being thus tensioned, raising the rear-portion of the link 296 and thereby withdrawing its hook-portion 297 from the cross-bar 60, causes said link, under the tension of said spring, to escape forwardly to restore the pin-restoring bail 290 to its normal position after the latter has co-operated to restore the "0" pins.

Raising of the rear-portion of the link 296 is effected by the suitably timed upward movement of a cross-rod 305, which, see Figures 16 and 17, also serves to withdraw the interponents 54, whereby the register-bars 41 are advanced seriatim for pin-setting as hereinbefore mentioned; said interponents, in order to avoid the possibility of pins 42 being indexed during the accumulation of a number, being withdrawn immediately after the cross-bar operating train begins its forward stroke and being restored again to their effective position as said train completes its return stroke. To swing said cross-rod 305 up and down, it is supported between arms 306 fast to a rock-shaft 307, which may be journaled in the side members 66 of the computing-mechanism framework. Near one end of said rock-shaft 307 is fastened an arm 308 carrying at its end a roll 309 normally bearing the bottom of a notch 310 of one of the cross-bar-operating train-racks 65 under the pull of a spring 311, attached to the arm 308.

From Figure 16 it will be seen that as soon as the rack 65 starts its forward stroke the roll 309 is forced upwardly out of the notch 310 of said rack 65, and hence the shaft 307 is rocked clockwise to swing the rod 305 downwardly and effect withdrawal of the interponents 54 from the pins 55 of the register-bars. As indicated in Figure 17, the roll 309 will drop into the notch 310 again under the pull of the spring 311, as the rack 65 completes its return stroke, thereby causing the rock-shaft 307 to turn counterclockwise to swing the cross-rod 305 upwardly and restore the interponents 54 again to their effective positions.

The cross-rod 305, being swung downwardly as soon as the cross-bar operating train begins its forward stroke and remaining down substantially throughout the ensuing accumulating operation of the mechanism, the rearward end of the link 296 under its own weight will drop downwardly as soon as the rear edge of the cross-bar 60 in its forward stroke has passed beyond the hook-portion 297 of said link. Near the end of the return stroke of said cross-bar 60, the rear edge of the latter encounters said hook-portion 297 as aforesaid and draws the link 296 rearwardly to rock the pin-restoring bail 290 and effect restoration of all the "0" pins with the consequent restoration of any higher pins that were set for the preceding accumulating operation. The upward stroke of the cross-rod 305 effected as just stated when the cross-bar operating train completes its return stroke is utilized to raise the rear end of the link 296, which to this end may have an extension 312 which the cross-rod 305 may engage. As the rear-portion of the link 296 is thus displaced upwardly by the upward swing of the cross-rod 305, its hook-shaped portion 297 is released from the rear edge of the cross-bar and said link escapes forwardly under the pull of the link-spring 299 to reassume its normal position and retract the pin-setting bail 290, as seen in Figure 16.

The ends of the computing-wheel spindle 91 may extend through the fixed plates 96 between which the computing-wheel shift-frame 92 is retained, each of said fixed plates 96 having an inverted L-shaped clearance opening 315 for the end of said spindle, which, in order to be secured against lateral displacement, may have threaded into its ends screws 316 whose heads overlap the clearance openings 315.

As an illustration of the operation of the computing mechanism, consider the following computing example, in addition:

```
    11
   +9
   20
```

The operator first sees that the subtraction-key is out for assurance that the computing mechanism is conditioned for addition. The tappet 50, which, as indicated in Figure 1, may also serve as a tabulating stop, having been properly set in relation to the work-sheet zone in which the first item "11" is to be typed, the operator presses the appropriate denominational tabulating key 318 and thereby, through connections not shown, raises the corresponding denominational stop 313 to set the typewriter-carriage 34 at the "tens" column of said zone. The item "11" is then typed on the work-sheet by operation of the numeral-keys 30, and during this operation the "1" index-pins 42 are caused to be set in the "tens" and "units" register-bars 41 of whatever register the tappet 50 is set for, it being understood that if only one tappet 50 is set only one set of register-bars will be indexed, and that by setting two tappets 50, one for each register, accumulation may be effected in two registers. The indexing of the "1" pins in the "tens" and "units" register-bars caused the "0" pins of said bars to be displaced upwardly.

The number "11" having thus been typed on the work-sheet and corresponding index-pins having been set, the computing mechanism is now ready to be operated for the accumulation of said number in the computing wheels. To this end, the clutch-device 80 is caused to be engaged by retraction of the conventionally indicated clutch-trip pin 319, which may be operated by a suitable key and connections (not shown), of the type shown in the aforesaid patent to Hart, illustrating the type of above clutch-device 80. Said clutch-device 80 is of such character that the computing-mechanism driving roller 71 makes one complete revolution and no more, inasmuch as said clutch-device 80 in the normal operation thereof automatically disengages itself after said one revolution, and the cross-bar 60 therefore makes only one complete forth and back movement.

In the initial portion of the forward stroke of the cross-bar 60, during which the cam 108 rotates, the computing-wheel pinions 88 are caused, by the rotation of said cam and the consequent rocking of the shaft 99, to drop into direct engagement with the register-bar racks 89. As the cross-bar 60 proceeds further in its advance stroke the "tens" and "units" register-bar engaging fingers 58 on said cross-bar engage the depressed "1" index-pins of the tens and units register-bars which are thereupon advanced one unit-space and the computing wheels 40 are also rotated clockwise one unit-space. Before the rack-engaging fingers 58 engaged the depressed "1" pins, the register-bar stops 179 were caused, by the rocking of the shaft 212 by cam 213, to be moved rearwardly to the position indicated in Figure 6 or 8, and in which position said stops abut the depressed "1" pins of the fully-advanced register-bars. At the end of the advance of said register-bars, the relative positions of the register-bar stops 179, the register-bar engaging fingers 58, and the cross-bar 60 in respect to the depressed "1" index-pins, are as indicated in Figure 6 or 8, from which it will be seen the advanced register-bars are secured against overthrow and rebound.

The cross-bar 60 having now fully advanced the "tens" and "units" register-bars for accumulation of the number "11", said cross-bar remains stationary for an interval while the driving rollers 71 pass the curved portion 75 of the cross-bar link 72, this stationary period in the operation of the cross-bar 60 affording time for carrying. No carrying operation, however, takes place during the accumulation of the number "11", it being understood that all the register-wheels were originally set at "0". After passing the curved portion 75 of the cross-bar link 72 the continued revolution of the driving roller 71 causes the cross-bar 60 to be returned.

In the initial portion of the return stroke of the cross-bar 60, the computing wheels are caused, by further rotation of the cam 108 and consequent reverse rocking of the shaft 99, to be disengaged from the register-bar racks 89 so as not to be reversed when the cross-bar 60 picks up the register-bars. The cross-bar 60 in its return movement picks up the advanced register-bars by engaging the projections 276 thereof, and, with the co-operation of the spring-device 57, returns them fully to their normal positions, as seen in Figure 1. The cross-bar 60 itself does not move back far enough to effect the full return of the register-bars. Said spring-device 57 completes the return of said register-bars in order to leave a gap 320 to afford sufficient room for the seriatim advance of the register-bars for indexing of the pins 42. During the return stroke of the cross-bar 60 and its operating train, the register-bar-stops 179 are moved forwardly again by the reverse rocking of shaft 212 by its cam 213 to leave room between the "0" pins and said stops for the aforesaid seriatim advance of the register-bars for pin-setting.

Preparatory to the engagement of the computing wheels with the register-bar racks 89, the aligning bars 235 are dropped, at the very beginning of the cross-bar 60 advance movement, into the teeth of the intermediate pinions 90, and then, almost immediately, are withdrawn again when the teeth of the computing-wheel pinions 88 are safely under the control of the teeth of the register-bar racks 89. The aligning bars 235 are similarly moved in and out again during the withdrawal of the computing-wheel pinions 88 from the register-bar racks 89, the in-and-out movements of the aligning bars being controlled and timed by the cams 252 and latches 253, which, in turn, are controlled by the cross-bar-operating train movements, as hereinbefore explained, so that said movements of the aligning bars 235 take place at the proper time.

Near the end of the cross-bar 60 return movement, the pin-restoring bails 290 are operated as aforesaid to effect restoration of the "1" pins of the "tens" and "units" register-bars by resetting the "0" pins of said register-bars.

After an accumulating cycle of the mechanism for the item "11" is thus completed, the typewriter-carriage 34 being returned either before or after said cycle, the next number "9" is typed on the work-sheet after tabulating said carriage 34 to the units column. The "9" pin will thereby be set in the "units" register-bar with a corresponding restoration of the "0" pin of said register-bar, and the clutch-device 80 is tripped to again operate the mechanism to accumulate "9". During this accumulating operation, the "units" register-bar advances nine spaces, thereby revolving the "units" computing wheel also nine spaces clockwise (the subtraction-key being out), and causing it to pass the carrying point, inasmuch as it previously registered "1" and now registers "0". As the "units" wheel so passes the carrying point, its carrying tooth 200 rocks the "units" carrying lever 201 and releases the corresponding stop-bar 181 to effect a forward advance of the register-bar-engaging finger 58 for the "tens" register-bar which is thus advanced one unit space. The "tens" wheel therefore, instead of showing "1", now shows "2". In this particular example, the carrying tooth 200 of the unit wheel released the stop-bar 181 as the unit register-bar was moving through its last unit space of movement, so that the carrying advance of the "tens" register-bar is probably effected by the power of the springs 182, 193, the actual carrying advance of the "tens" register-bar probably taking place while the driving roller 71 is passing the curved portion 75 of the driving link 72.

During the return stroke of the cross-bar 60 and the accompanying counterclockwise rotation of the rock-shaft 212, all the stop-bars 181, except the one which was released for carrying and which therefore already abuts the bar 195, are moved forwardly again by the forward movement of the latch-bar 183, said latch-bar passing slightly beyond the latching edge 184 of the released stop-bar, and thereby causing the released stop-bar to be latched again, as indicated in Figure 1. Similarly the latch-bar 183 also passes, it may be noted, beyond the latching edges 184 of the other bars 181, after the edges 180 of said other bars in their forward movement finally abut said bar 195. Aside from the release and restoration of a stop-bar 181 and its related parts for carrying the operations of the mechanism are the same for the accumulation of "9" as were the operations for the accumulation of "11". That is to say, the computing wheels are moved into and out of engagement with the register-bar racks 89, the aligning bars 235 are actuated, and the "9" pin of the unit register-bar is finally restored by resetting the "0" pin of said bar through operation of the pin-restoring bails 290.

In the subtractive computing example $$\begin{array}{r} 10 \\ -1 \\ \hline 9 \end{array}$$

"10" is first typed and indexed in the "tens" and "units" register-bars, and with the subtraction-key 134 out for addition, the computing mechanism is operated to accumulate "10" as aforesaid. The "1" pin in the "tens" register-bar, which, it may be noted, happens to be the only pin indexed, is restored at the end of the accumulating operation. The "1" to be subtracted is now typed and correspondingly the "1" index-pin of the units register-bar is set, it being noted that the pin which is set always has the same value as the operated numeral-key, irrespective of whether the item is to be added or subtracted. It may also be noted that in subtraction the zero pin of a register-bar is also, as in addition, restored by the setting of a higher pin in said bar.

In the accumulating operation of the computing mechanism, which is now to take place, the computing wheels must be rotated reversely or counterclockwise in order that the "1" may be subtracted. Before a computing cycle is initiated therefore by engagement of the clutch-device 80, the subtraction-key must be first pressed in. By pressing in the subtraction-key the rock-shaft 104 will be actuated by the rotation of cam 108, instead of the rock-shaft 99 which remains stationary during the subtractive accumulating operation.

As hereinbefore stated, a clockwise swing of the rock-shaft 104 driven by said cam 108, moves the computing wheels rearwardly into engagement with the intermediate pinions 90 and therefore the forward movements of any pin-bars 41 causes said computing wheels to be rotated reversely. The "units" wheel which registers "0" is therfore rotated one space reversely from said "0" position to the "9" position, and thus the carrying tooth 200 of said "units" wheel displaces its carrying lever 201, causing the corresponding bar 181, which extends to the "tens" register-bar to be released, with the result that said tens register-bar advances one unit-step forwardly. The "tens" wheel, driven through an intermediate pinion 90, is rotated reversely one step or from "1" which it previously registered to "0", and the dial-wheels as a whole now indicate "9", which is the correct result of the above subtractive computing example.

Except for the reversed rotation of the computing wheels caused by their engagement and disengagement with the intermediate pinions 90 instead of with the register-bar racks 89, the accumulating operation of the mechanism and the preparatory indexing of the pins 42 are the same for subtracting a number as for adding a number, that is to say, the operation of the carrying trains is the same in both cases, and the restoration of the index-pins, by resetting all "0" pins, is also the same in both cases. Operations of the aligning bars 235 is also the same in both cases.

At the end of a subtractive computation the mechanism may be restored to its normal additive condition by releasing the subtraction key 134, said release being effected, as aforesaid, by simply pressing the subtraction-key in a little way further to relase it from its latching device and then letting it go.

Variations may be resorted to within the scope of the invention, and portions of the improvements may be used without others.

Having thus described my invention, I claim:

1. In a computing machine, the combination of a series of rotatable register-wheels, a series of reciprocatable racks effective to engage and drive said wheels in one direction, a series of idler gears engaging the same racks, effective to drive said wheels in the opposite direction, the wheels and idlers having a tandem arrangement along the racks, and means for shifting the wheels selectively into effective rotative engagement with the racks or the gears to predetermine the direction of rotation of said wheels.

2. In a computing machine, the combination of a series of register-wheels, a series of racks effective to rotate the wheels in one direction, extents of movements depending on the numbers computed in the machine, a series of gears driven by the racks and effective to rotate said wheels, in the opposite direction to corresponding extents, and means for mounting said wheels above the racks and to one side of the gears, whereby the wheels may be engaged for rotation by moving the same in either one of two perpendicular paths into engagement with either the racks or gears.

3. In a computing machine, the combination of a series of register-wheels, a series of wheel-actuators including racks normally disengaged from, but effective to rotate, said wheels, extents of movements depending on the numbers computed in the machine, a series of actuators, driven by said racks, selectively effective to rotate said wheels, a frame pivoted in said machine, for supporting and positioning said wheels for rotation, and movable means engaging said frame for shifting the wheels in either one of two perpendicular paths into engagement with one or the other of said wheel-rotating actuators.

4. In a computing machine, the combination of a series of register-wheels, a series of reciprocable wheel-actuators to rotate the same in one direction, extents of movements depending on the numbers computed in the machine, a series of actuators separate from, but actuated by, said reciprocable actuators selectively effective to rotate said wheels in the opposite direction and the same extents, a frame pivoted in said machine, for supporting and positioning said wheels for rotation, and power-driven means for moving the frame in either one of two perpendicular paths to bring said wheels into engagement with one or the other of said series of actuators, said power-driven means being also effective to restore the frame to normal position.

5. In a computing machine, the combination of a series of register-wheels, a set of wheel-actuating rack-bars, each bar having a plurality of indexing set-up pins, a set of rack-driven gears, each set of bars and gears effective selectively to rotate the wheels, normally disengaged therefrom, predetermined extents of rotation, according to the amount set up by said pins, a stationary frame mounted in the machine, a swingable frame including a pivot at each side thereof, extending through and beyond slots in the stationary frame, and means engaged with the extended ends of said pivots, effective to move the swingable frame to bring said wheels into rotatable engagement with said driving gears to run the wheels the amount set up in said rack-bars into the wheels.

6. In a computing machine, the combination with a series of register-wheels, of a series of racks and a series of pinions meshing therewith, having various extents of movements, the respective tooth-lines of the racks and the sides of the pinions forming a corner, a register-wheel frame, and means shiftably supporting said frame so that the register-wheels are positioned within said corner, normally disengaged from the racks and pinions, and whereby said frame may be shifted to selectively engage said wheels with either the racks or the pinions to determine the direction of rotation thereof.

7. In a computing machine, the combination with a series of register-wheels, of a series of racks having various extents of reciprocatory movements, a series of pinions meshed with the racks, the respective tooth-lines of the racks and the sides of the pinions forming a corner within which the register-wheels are positioned, normally disengaged from both the racks and the pinions, a support, a register-wheel frame having a pivotal connection with said support, means for rotating said frame about said pivotal connection to engage said register-wheels with the racks, and additional means for effecting linear displacement of said frame to engage the register-wheels with the pinions.

8. In a computing machine, the combination with a series of register-wheels, of a series of racks having various extents of reciprocatory movements, a series of pinions meshed with the racks, a support, a movable register-wheel shifting frame having a pivotal connection with said support, means for rotating said frame about the pivotal connection to engage said register-wheels with the racks, and means for rectilinearly displacing said frame to engage the register-wheels with the pinions, said support having a guide-slot to support and guide the frame for said rectilinear displacement to engage the wheels with said pinions.

9. In a computing machine, the combination of a series of computing wheels, operating devices for said wheels, each in the form of a combined rack and idler, the rack for addition, and the idler for subtraction, means for supporting said wheels and shifting them in different directions, for engagement with either the racks or the idlers, said wheels normally disengaged from both racks and idlers, wheel detent-means interlocking with said wheels while disengaged, and means acting upon said detent-means to cause the withdrawal of the detent-means themselves concomitantly with the shift of said wheels in one direction, said detent-means being arranged so that upon the shift of said wheels in the other direction said wheels themselves withdraw from said detent-means.

10. In a computing machine, the combination of a series of computing wheels, a set of operating devices for said wheels, each in the form of a combined addition rack and subtraction idler, the rack and idler arranged to form an angle or corner within which the computing wheel is positioned for co-operation with either rack or idler, a computing-wheel frame shiftable in one direction for engagement of said wheels with the racks, and shiftable in a direction substantially perpendicular to the first direction of shift for engagement of said wheels with the idlers, detent-means interlocking with said wheels while disengaged from both racks and idlers and shiftably supported in said frame, and means whereby said detent-means are shifted relatively to said frame upon movement of the latter in either direction, thereby to cause the release of said wheels from said detent-means upon engagement of said wheels with either racks or idlers.

11. In a computing machine, the combination with a set of register pinions, of a set of reciprocable drive racks engageable therewith, a stationary set of idler gears permanently meshing with the same racks, the register pinions having a tandem arrangement with reference to the idler gears, and being normally disengaged from both the racks and the idler gears, to permit independent retraction of the racks, and selective means for shifting the pinions in a direction either lengthwise of the racks into mesh with said idler gears, or transversely of said racks into mesh therewith.

12. In a computing machine, the combination with a series of register-wheels and a series of racks effective to engage said wheels to rotate the same in one direction, of gears actuated by said racks, effective to engage with said wheels to rotate the same in the opposite direction, each wheel, rack and gear being permanently confined in a single plane, key-controlled mechanism to shift the wheels in their said planes bodily into engagement with either the racks or said gears, to determine the direction of rotation of the wheels, the latter being normally disengaged from both racks and gears, and detents normally meshing with the wheels in their idle positions, to prevent their rotation.

13. In a computing machine, the combination of a main frame for the machine, parallel side plates mounted therein, a movable frame supported by and mounted between said side plates, a set of register-wheels rotatably supported within said movable frame, a set of racks below said register-wheels and effective to rotate the wheels in one direction for adding, a set of idlers combined with the racks and mounted in rear of said register-wheels and effective to rotate the wheels in the opposite direction for subtracting, and power-driven manually-controlled means, effective to shift said movable frame either downwardly or rearwardly to engage the wheels with either racks or idlers.

14. In a computing machine, the combination of a main frame for the machine, a frame movable either downwardly or rearwardly, a set of register-wheels, a shaft upon which the wheels rotate, journaled in said movable frame, a plurality of racks effective to rotate the wheels in one direction for adding, a plurality of idlers meshing with the same racks and effective to rotate the wheels in the opposite direction for subtracting, one adding rack and one subtracting idler for each wheel, the rack and idler for each wheel being geared together in the same plane therewith for simultaneous operation, means to engage the wheels with either the racks or the idlers, according to the kind of computation to be effected, and means effective to lock the movable frame in either of said engaged positions during the time of operation of said racks and idlers.

15. In a computing machine, the combination with a set of register-wheels, of racks having idlers combined therewith for causing said register-wheels to add or subtract, a frame supporting said wheels, plates flanking said frame, a main framework in which said plates are fixed, said supporting frame having gudgeons loosely engaging said plates, mechanism engaging said gudgeons to move said supporting frame to bring the wheels into rotative engagement with the idlers for subtraction, mechanism also engaging said frame to rock the same about said gudgeons into rotative engagement with the racks for addition, and a shaft in said frame upon which the wheels rotate, said shaft having extension ends passing through slots in said flanking plates to be guided thereby.

16. In a computing machine, the combination with a series of computing wheels, of a series of underlying reciprocatory drive-racks for the wheels and a series of idle gears in rear of the wheels and permanently meshed with the same racks, the racks and the idle gears being effective to actuate the wheels, the wheels being normally disengaged from both the racks and gears, selectively adjustable means to predetermine the direction of rotation of the wheels by bringing the same downwardly or rearwardly into effective rotative engagement with either the racks or the gears, preparatory to the wheel-rotating movements of the same, and means whereby the wheels are automatically disengaged from either the racks or the gears by an upward or forward movement, preparatory to the opposite movements of the racks and gears.

17. In a computing machine, the combination of a series of register-pinions and alterative pinion-operating devices including racks meshing with the pinions and idlers also meshing with the racks, said devices arranged for separately rotating said pinions in either one of opposite directions, a register-pinion supporting frame, means for shifting said frame to move said pinions downwardly or rearwardly to cooperate with one or the other set of operating devices, including a cam timed with the device movements, a cam-follower actuated by the cam, a shifter moved by the follower to shift said frame to move the pinions downwardly to engage the racks for addition, a second shifter similarly moved to shift said frame to move the pinions rearwardly to engage the idlers for subtraction, and means whereby the shifters may be separately connected to said cam-follower, including means whereby connecting one shifter with the cam-follower disconnects the other shifter therefrom.

18. In a computing machine, the combination with a series of register-wheels, of racks, idlers driven by said racks, said racks and idlers effective selectively to rotate said wheels, a support for said wheels, a device for moving the support to shift the wheels in one direction to engage them with one series of rotating means, a second device for moving the support to shift the wheels in a transverse direction to engage them with the other set of rotating means, a power-drive for said moving devices, and manually-adjustable means to connect the moving devices selectively with said power-drive, to predetermine which moving device is to operate, according to the kind of computation to be effected in the machine.

19. In a computing machine, the combination with a set of computing pinions, of a set of driving racks, indexing devices therefor, a set of idlers constantly meshing with the same racks, the set of pinions being normally disengaged from both the racks and the idlers, each pinion being in the same plane with its rack and idler, and selective means for shifting the pinions either transversely of the racks, to mesh the pinions with the racks, or in a direction about parallel with the racks, to mesh the pinions with the idlers.

20. In a computing machine, the combination of a series of additive pinions, a set of reciprocatory driving racks for co-operation with said pinions, a set of toothed subtractive idlers driven by said racks and also capable of co-operation with said pinions alternatively with the racks, whereby the pinions may be driven either forwardly or backwardly at the advance of the racks, said pinions being normally disengaged from both the racks and the idlers, means for shifting said pinions in one direction from normal position for engagement with said racks, and in a different direction for engagement with said idlers, a set of detents normally engaged by the pinions to prevent rotation thereof, and means for withdrawing said detents from the pinions concomitantly with the shift of said pinions in one direction to additive position; said pinions withdrawing from said detents as the pinions shift in the other direction to the subtractive position.

21. In a computing machine, the combination of a series of computing pinions, a set of reciprocatory driving racks for co-operation with said pinions, a set of toothed idlers constantly meshing with said racks and also capable of co-operation with said pinions, whereby the pinions may be driven either forwardly by the racks or backwardly by the idlers, said pinions being normally disengaged from both the racks and the idlers, said racks and idlers being arranged to form an angle or corner within which the pinions are positioned for engagement with either the racks or the idlers, a frame carrying said pinions and shiftable transversely of the racks, to effect engagement of said pinions with said racks, and shiftable longitudinally of the racks for effecting engagement of said pinions with the idlers, detents interlocking with said pinions while normally disengaged from both the racks and the idlers, and means shiftably supporting said detents, said detent-supporting means and said pinion-frame being relatively movable at each movement of the pinion-frame, for effecting the release of the pinions from said detents upon engagement of the pinions with either the racks or the idlers.

22. In a computing machine, the combination with a set of computing pinions, of a set of driving racks, a set of idle gears meshing with the racks, said pinions normally out of mesh, a shiftable frame in which said pinions are mounted, side plates between which said frame is guided, said frame having gudgeons which are supported by said side plates, a rock-shaft having a horizontal slotted arm whereby it engages said frame to swing it down upon said gudgeons to mesh said pinions with said racks, and a second rock-shaft having upstanding arms to engage said gudgeons to carry said frame rearwardly to mesh the pinions with the idle gears.

23. In a computing machine, the combination with a set of computing pinions, of a set of driving racks, a set of idle gears meshing with the racks, said pinions normally out of mesh, a shiftable frame in which said pinions are mounted, side plates between which said frame is guided, said frame having gudgeons which are supported by said side plates, a rock-shaft having a horizontal slotted arm whereby it engages said frame to swing it down upon said gudgeons to mesh said pinions with said racks, and a second rock-shaft having upstanding arms to engage said gudgeons to carry said frame rearwardly to mesh the pinions with the idle gears, said frame having a shaft whereon said pinions are mounted, said pinion-shaft having extensions at its ends, said side plates having L-shaped openings in which said extensions move during the shifting operations of said frame.

24. In a computing machine, the combination with a set of computing pinions, of a set of driving racks under the pinions, a set of idle gears in rear of the pinions and meshing with the racks, said pinions normally out of mesh, a shiftable frame in which said pinions are mounted, side plates between which said frame is guided, said frame having gudgeons which extend loosely through said side plates, said frame having a shaft, a rock-shaft having a horizontal arm provided with a slot whereby it engages said frame-shaft to swing said frame down upon said gudgeons to mesh said pinions with said racks, a second rock-shaft having upstanding arms slotted to engage said gudgeons to shift said frame rearwardly to mesh the pinions with the idle gears, said side plates having horizontal slots into which said gudgeons extend for guiding said frame rearwardly, said frame-shaft moving idly in the slot of said horizontal arm during such rearward shifting, and means locking said upstanding arms during the rocking of said shiftable frame up and down, to prevent said gudgeons from moving rearwardly in said horizontal plate-slots.

25. In a computing machine, the combination with a set of computing pinions, of a set of driving racks under the pinions, a set of idle gears in rear of the pinions and meshing with the racks, said pinions normally out of mesh, a shiftable frame in which said pinions are mounted, side plates between which said frame is guided, said frame having gudgeons which extend loosely through said side plates, said frame having a shaft, a rock-shaft having a horizontal arm provided with a slot whereby it engages said frame-shaft to swing said frame down upon said gudgeons to mesh said pinions with said racks, a second rock-shaft having upstanding arms slotted to engage said gudgeons to shift said frame rearwardly to mesh the pinions with the idle gears, said side plates having horizontal slots into which said gudgeons extend for guiding said frame rearwardly, said frame-shaft moving idly in the slot of said horizontal arm during such rearward shifting, and means locking said upstanding arms during the rocking of said shiftable frame up and down, to prevent said gudgeons from moving rearwardly in said horizontal slots, said frame also having a shaft whereon said pinions are mounted, said pinion-shaft having extensions at its ends, and said side plates having L-shaped frame supporting and guiding openings in which said extensions move during the shifting operations of said frame.

26. In a computing machine, the combination with a set of drive racks, of a set of idlers constantly meshing therewith, a set of pinions normally out of mesh but engageable with either the racks or the idlers, a shiftable frame on which said pinions are mounted, plates flanking said frame and having guide-slots receiving projections upon the shiftable frame, a shifter including a rock-shaft having an arm engaging said shiftable frame to depress it to mesh the pinions with the racks, projections on said shiftable frame forming a pair of gudgeons upon which the frame rocks when depressed by means of said arm, a general operator, a cam-follower cycled to and fro by said general operator, a link connecting said cam-follower to said shifter, whereby normally the machine is operated for addition, a subtraction key, a second shifter including a rock-shaft, said second rock-shaft being idle at the addition operation, said second rock-shaft having an arm, means controlled by said key for bolting the arm of said second rock-shaft to said cam-follower, and means also controlled by said subtraction key for silencing said follower with respect to said link.

27. Machine constructed according to claim 26, the cam-follower having a pin, said link having an L-shaped slot in which said pin may play, one portion of said slot being effective, and the other portion being idle, said pin normally causing said cam-follower to drive the first of said rock-shafts, said key-controlled means including a bell-crank provided with an arm to depress said link to bring its idle slot into line with the cam-follower pin, and a bolt mounted to slide up and down on said cam-follower and having a stud engaging a vertical slot in said cam follower and having a head engaging a notch in the arm on said second rock-shaft, and said bell-crank having a slot to engage said pin to lift said bolt and thereby lock the cam-follower to the arm to effect a subtraction shift.

28. Machine constructed according to claim 26, the cam-follower having a pin, said link having an L-shaped slot in which said pin may play, one portion of said slot being effective, and the other portion being idle, said pin normally causing said cam-follower to drive the first of said rock-shafts, said key-controlled means including a bell-crank provided with an arm to depress said link to bring its idle slot into line with the cam-follower pin, a bolt mounted to slide up and down on said cam-follower and having a stud engaging a vertical slot in said cam-follower and having a head engaging a notch in the arm on said second rock-shaft, and said bell-crank having a slot to engage said pin to lift said bolt and thereby lock the cam-follower to the arm to effect a subtraction shift, and a detent normally disengaged, said link having a notch which drops into engagement with said detent when the link is silenced, to lock the addition rock-shaft and its appurtenances against displacement.

29. In a computing machine, the combination with a general operator, of a set of register-pinions, a shiftable pivoted frame whereon they are mounted for rotation, a set of racks and a set of idle gears all out of mesh with said pinions, said idle gears constantly in mesh with said racks, means normally cycled by said general operator for swinging said frame down about its pivot, to bring the pinions into mesh with the racks, means for translating said frame longitudinally of the racks, to bring the pinions into mesh with the gears, a pair of plates between which said frame is mounted, said plates having guide slots into which gudgeons on said frame either rotate or slide rearwardly, said shiftable frame having a shaft whereon said pinions are mounted, said shaft having projecting ends, and said plates having L-shaped guiding and supporting slots for said projecting ends, and an arm having a slotted connection with said pinion-frame for swinging the latter to bring the pinions into mesh with the racks, the pinion-frame traversing the slot in said arm when the pinion-frame is translated to bring the pinions into mesh with the idle gears.

30. In a computing machine, the combination with a shiftable set of computing pinions, of a set of racks and a set of idle gears driven by the racks, said pinions normally disengaged from the racks and the idle gears, detents normally holding the pinions from rotation, a general operator including means for withdrawing the pinions from the detents and meshing them with either the racks or the idlers, and also including means for driving the racks, a normally idle aligner bar for the idle gears, and means actuated by the general operator for aligning said idle gears by operating and withdrawing said aligner bar prior to the engagement of the pinions with the racks or idle gears.

31. In a computing machine, the combination with a shiftable set of computing pinions, of a set of racks and a set of idle gears driven by the racks, said pinions normally disengaged from the racks and the idle gears, detents normally holding the pinions from rotation, a general operator including means for driving the racks, a normally idle aligner bar for the idle gears, and means actuated by the general operator for aligning said idle gears by operating and withdrawing said aligner bar prior to the engagement of the pinions with the racks or gears, and for again operating and withdrawing said aligner bar preparatory to the unmeshing of the pinions and reengagement of the detents thereby.

32. In a computing machine, the combination with a shiftable set of computing pinions, of a set of racks and a set of idle gears driven by the racks, said pinions normally disengaged from the racks and the idle gears, detents normally holding the pinions from rotation, a general operator including means for driving the racks, a normally idle aligner bar for the idle gears, means actuated by the general operator for aligning said idle gears by operating and withdrawing said aligner bar prior to the engagement of the pinions with the racks or gears, and for again operating and withdrawing said aligner bar preparatory to the unmeshing of the pinions and reengagement of the detents thereby, said aligning means including a one-revolution cycling shaft, connected to said general operator, a cam-device upon said shaft having opposite notches, an arm provided upon said aligner bar to move into and out of one notch at the beginning of the cycling operation, and to move into and out of the other notch midway of the cycling operation, and a spring for forcing the aligner bar into notches in the idle gears.

33. In a computing machine, the combination with a series of register-pinions and a series of racks effective to engage said pinions to rotate the same in one direction, of idle gears actuated by said racks, effective to engage with said pinions to rotate the same in the opposite direction, a cycling mechanism, means actuated thereby to shift the pinions bodily into engagement with either the racks or said gears, to determine the direction of rotation of the pinions, the latter being normally disengaged from both racks and gears, detents normally meshing with the pinions in their idle positions, to prevent their rotation, an aligner bar normally disengaged from said idle gears, a spring to actuate said aligner bar, a cam-device normally supporting said aligner bar out of mesh with said idle gears, and means actuated by said cycling mechanism for causing said supporting device to release said aligner bar to be operated by its spring prior to meshing said pinions with either the gears or the racks, and again just prior to the reengagement of said pinions with said detents.

34. Machine constructed according to claim 33, including a one-revolution shaft which is given a partial revolution by the movement of the cycling mechanism in one direction, and the remainder of its revolution by the return movement of the cycling mechanism, and also including a part actuated by the cycling mechanism independently of said cam-shaft, to effect the release of said aligner bar just prior to the re-engagement of the pinions with their detents.

35. In a computing machine, the combination of a series of register-wheels, a combined rack and idler normally disengaged from said wheels and effective to rotate the same forwardly or rearwardly according to whether the machine is to add or subtract, respectively, the rack being under the wheels, and the idler being in rear of the wheels, a presettable indexing device, to determine the extent of rotation of said wheels according to the amount to be run in the register, rocker-shafts having means for shifting the wheels either downwardly or rearwardly into operative engagement with either the rack or the idler, a rotatable member to actuate the rocker-shafts, one shaft for setting the wheels to add, the other shaft for setting the wheels to subtract, a clutch between each shaft and the driver, and manually-operated means for controlling the clutches to selectively connect the shafts to said member for operation thereby.

36. In a computing machine, the combination of a series of register-wheels and an operating device for said wheels in the form of a combined rack and idler, a register-wheel supporting frame, means for shifting said frame, including a cam timed with the device movements, a cam-follower actuated by the cam, a shifter moved by the follower to shift said frame to move the wheels in one direction to engage the set of racks for addition, a second shifter to shift said frame to move the wheels in another direction to engage the set of idlers for subtraction, means whereby the first shifter is normally connected to said cam-follower, a settable subtraction-key, and means whereby setting of said subtraction-key disconnects the first shifter and connects the subtraction-shifter to said cam-follower to set the machine for subtraction.

37. In a computing machine, the combination of a series of register-wheels, operating devices each in the form of a combined rack and idler, the racks to rotate the wheels in one direction for addition, and the idlers to rotate the wheels in the opposite direction for subtraction, means for shifting said wheels to co-operate with either the racks or the idlers, including a cam timed with the movements of said operating devices, a cam-follower actuated by said cam, a shifter moved by said follower to shift said frame in one direction, a second shifter similarly moved to shift said frame in the other direction to determine the direction of rotation of the wheels, and means whereby the connecting of one shifter into effective position causes the locking of the other shifter in ineffective position.

HENRY L. PITMAN.